United States Patent [19]

Waki et al.

[11] Patent Number: 4,797,426

[45] Date of Patent: Jan. 10, 1989

[54] HARD POLYVINYL CHLORIDE RESIN COMPOSITION AND OPEN-CELL FOAM MADE OF SAID COMPOSITION

[75] Inventors: Tatsuo Waki; Takeshi Watanabe; Kazuo Suzuki, all of Tsuchiura, Japan

[73] Assignee: Lonseal Corporation, Tokyo, Japan

[21] Appl. No.: 122,686

[22] Filed: Nov. 18, 1987

[30] Foreign Application Priority Data

Feb. 21, 1987 [JP] Japan .................................. 62-38231
Oct. 6, 1987 [JP] Japan ................................ 62-250614

[51] Int. Cl.⁴ ............................................... C08J 9/06
[52] U.S. Cl. ........................................ 521/93; 521/98; 521/134; 521/145
[58] Field of Search .................... 521/134, 145, 93, 98

[56] References Cited

U.S. PATENT DOCUMENTS

| | | | |
|---|---|---|---|
| 3,717,595 | 2/1973 | Huntzinger et al. | 521/145 |
| 3,975,315 | 8/1976 | Parks | 521/145 |
| 4,025,465 | 5/1977 | Dorrn et al. | 521/145 |
| 4,427,795 | 1/1984 | Dorrestivn et al. | 521/145 |
| 4,701,472 | 10/1987 | Koebisu et al. | 521/145 |

Primary Examiner—Morton Foelak
Attorney, Agent, or Firm—Oblon, Fisher, Spivak, McClelland & Maier

[57] ABSTRACT

A hard polyvinyl chloride resin composition is provided, which contains as essential components thereof the following components (a)–(e):
(a) a polyvinyl chloride base resin produced by suspension polymerization and/or bulk polymerization;
(b) a super high molecular acrylic resin base processing aid;
(c) a stabilizer containing one or more Group-II and/or Group-IV metals;
(d) a surfactant; and
(e) a heat-decomposable organic foaming agent. The above composition is formed by extrusion into a hard polyvinyl chloride resin open-cell foam.

36 Claims, 1 Drawing Sheet

HARD POLYVINYL CHLORIDE RESIN COMPOSITION AND OPEN-CELL FOAM MADE OF SAID COMPOSITION

BACKGROUND OF THE INVENTION (1) Field of the Invention:

This invention relates to resin compositions for providing novel hard polyvinyl chloride (which may hereinafter be abbreviated as PVC) resin open-cell foams which are useful in a wide variety of application fields such as underdrain pipes, various aeration pipes, slope draining piles, various air filters, solid-gas separating materials, solid-liquid separating materials, materials for jetting or bubbling gas into liquid, deodorant bases and fragrance carriers, and also to the open-cell foams thus obtained from the compositions.

(2) Description of the Prior Art:

As open-cell foams made of a synthetic resin, flexible urethane foams obtained by a reaction between a saturated polyester and a polyether have been well known to date. Besides, there are polyvinyl alcohol (which may hereinafter be abbreviated as "PVA") base sponges obtained by adding α-starch as a cell-forming agent to PVA and subsequent to conversion into a formal, washing away the starch with water.

As known processes for obtaining open-cell PVC resin foams, there are those disclosed, for example, in Japanese Patent Publication No. 21898/1978, U.S. Pat. No. 4,226,943, and Japanese Patent Publication Nos. 50662/1983, 25369/1983 and 58370/1983.

The invention described in Japanese Patent Publication No. 21898/1978 relates to a process for producing an open-cell foam by forming a mixture, which contains at least one polymer of emulsion homopolymer and emulsion copolymers of vinyl chloride, a plasticizer and a foaming agent, into a sheet-like shape, followed by heating, characterized in that the mixture is added with at least one wax selected from paraffin waxes having a carbon number of 20-80 and ester type waxes consisting of monohydric and polyhydric alcohol esters of higher aliphatic monobasic acids and having 20-80 carbon atoms, said at least one wax having substantially no miscibility with said at least one polymer.

The invention described in U.S. Pat. No. 4,226,943 is directed to a process for the production of a sheet-like open-cell foam of a PVC base resin, which comprises the steps of forming a foamable PVC resin composition into a sheet and then heating the sheet to a temperature at which a foaming agent is decomposed in the sheet. The composition is composed of the following components:

(1) 100 phr of a PVC base resin;
(2) 30–150 phr of a plasticizer;
(3) 1–8 phr of a synthetic hydrocarbon wax, which has been prepared in the course of a process selected from depolymerization of polyethylene, polymerization of ethylene and Fisher-Tropsch synthesis of coal gas and has a molecular weight of 1,500–7,000, a softening point of 90°–135° C. and a particle size of 10–100 μm;
(4) 1–5 phr of an alkali metal-Zn type stabilizer; and
(5) 2–10 phr of a heat-decomposable organic foaming agent at least 60% of which is composed of azodicarbonamide.

Although the PVC base resin employed in the latter invention is not specifically described as an "emulsion polymer", it is clearly recited in its descriptive portion that a PVC base resin produced by emulsion polymerization is used. Further, a PVC base resin produced by emulsion polymerization was used in each of the Examples. It is hence apparent that like the former invention, the latter invention is also directed to a process for producing an open-cell foam from an emulsion polymer resin by a coating technique.

The features of these inventions may be summarized as follows:

(1) A PVC base resin produced by emulsion polymerization is used.

(2) The product is a soft sheet-like product containing a plasticizer in a large amount.

(3) A heat-decomposable organic foaming agent is used (4) As essential components, are added:
 (1) a wax (in the case of Japanese Patent Publication No. 21898/1978); or
 (2) a wax and an alkali metal-Zn type stabilizer (in the case of U.S. Pat. No. 4,226,943);

(5) Other necessary components are added to form a past-like coating formulation.

(6) The above coating formulation is applied to a base, followed by its gelation into a sheet.

(7) The sheet is heated in a foam oven to expand same into an open-cell foam.

The three inventions described respectively in Japanese Patent Publication Nos. 50662/1983, 25369/1983 and 58370/1983 have been assigned commonly to the present assignee and constitute basis for the present invention.

The invention described in Japanese Patent Publication No. 50662/1983 relates to a process for the production of an open-cell foam, which comprises heating and kneading a resin mixture prepared by adding, to a PVC base resin useful generally as a plastisol, a plasticizer, a mixed or composite stabilizer formed in combination of an organic stabilizer containing a Group-I metal of the periodic table and another organic stabilizer containing zinc and one or more other metals, powder of a heat-decomposable organic foaming agent employed usually as a foaming agent for the formation of open cells, such as azodicarbonamide, and if necessary, one or more other additives; processing the thus-kneaded mixture into a sheet by a suitable technique such as calendering or extrusion; and then heating the sheet to the decomposition temperature of a foaming agent.

The invention described in Japanese Patent Publication No. 25369/1983 is directed to a process for the production of an open-cell foam, which comprises heating and kneading a resin mixture, processing the thus-kneaded resin mixture into a sheet by a suitable technique such as calendering or extrusion, and then feeding the sheet to a foam oven to heat and expand same. The resin mixture is prepared by adding, to a suspension-polymerized general-purpose PVC base resin as a principal component, a combination of an organic stabilizer containing a Group-I metal of the periodic table and another organic stabilizer containing a Group-II metal of the periodic table, or an organic stabilizer containing both Group-I and Group-II metals of the periodic table; a combination of an anionic surfactant and a non-ionic surfactant, or a combination of an anionic surfactant and a low polymerization-degree polyolefin or wax; and further a plasticizer; a heat-decomposable organic foaming agent employed generally for the production of open-cell foams such as azodicarbonamide; and other additives such as filler as needed.

The invention of Japanese Patent Publication No. 58370/1983 is directed to a process for the production of an open-cell foam, which comprises heating and kneading a mixture of a PVC-base resin composition (containing a PVC-base resin, plasticizer, stabilizer, filler, etc.), 4,4'-oxybis(benzenehydrazide) as a foaming agent and an anionic surfactant, forming the thus-kneaded mixture into a sheet and then heating and expanding the sheet.

The technical concept common to these three invention may be summarized as follows:

(1) As a processing method, a sheet is formed first of all by calendering (or extrusion) and the sheet is subsequently heated in a foam oven to foam the sheet.

(2) As a PVC-base resin, is used that produced by suspension polymerization (an emulsion-polymerized resin is used in Japanese Patent Publication No. 50662/1983 only).

(3) The foam is a soft PVC-base resin product in which 55–80 phr of a plasticizer is contained.

(4) As a stabilizer, is used a mixture of a stabilizer containing a Group-I metal of the periodic table and another stabilizer containing a Group-II metal of the periodic table, or a composite stabilizer containing both Group-I and Group-II metals of the periodic table.

(5) A surfactant is used (no surfactant is employed in Japanese Patent Publication No. 50662/1983).

The products obtained in accordance with these inventions are suitable for use as interior finishes for automotive vehicles and upholsteries. Accordingly, many of such products are used in a form laminated with a backing such as knitted fabric, plain weave fabric or non-woven fabric. For such applications, the above-mentioned inventions including those of Japanese Patent Publication No. 21898/1978 and U.S. Pat. No. 4,226,943 are extremely effective. They are however not applicable at all for the above-mentioned application field, namely, for the production of hard PVC-base resin products, especially, formed articles such as pipe-like products and plate-like products.

On the other hand, PVA sponge is hard and remains in a state excellent in strength so long as it is dry. It is however softened upon exposure to water or moisture and is hence unapplicable to the above application fields. A cumbersome reaction such as conversion into an acetal is additionally required in order to convert PVA sponge into a state that it is no longer softened with water. Further, polyurethane foams are obtained only as irregular open-cell foams and are thus inappropriate for the above application fields.

In order to produce an open-cell foam of a hard PVC-base resin, it is not suitable to add a plasticizer in a large amount as a first requisite. Even if added (it is not added to obtain a soft foam but is incorporated as a processing aid so as to facilitate the extrusion processing), the plasticizer is limited to a very small amount of 5 phr or less. The thermal and rheological behavior of the composition of raw materials for the open-cell foam of the hard PVC-base resin upon its processing is therefore different totally from that of a raw material composition for a soft PVC-base resin product.

Pipes, plate-like products, rod-like products and other like products are formed by extrusion. In this case, the formation of open cells in a formed article must be performed at a time point that the composition of raw materials has just passed through a die of an extruder. It is therefore impossible to apply conventional processes, namely, to form the raw material composition into a sheet beforehand by calendering or extrusion and then to heat the sheet again so as to foam it into an open-cell foam.

In the case of an open-cell foam composed of a hard PVC-base resin, its production process requires such steps that the resin is heated and kneaded in an extruder to gel and melt the resin and at the same time to decompose and gasify a foaming agent, the resin is caused to expand concurrently with the completion of its passage through a die of the extruder, and the open-cell foam is formed by the expansion. These process requirements cannot however be fulfilled by any of the above-described conventional inventions no matter they are applied singly or in combination.

SUMMARY OF THE INVENTION

It is a principal object of this invention to achieve the above-mentioned process requirements by an absolutely new technical concept unseen in the abovedescribed conventional inventions.

In one aspect of this invention, there is thus provided a hard polyvinyl chloride resin composition comprising, as essential components thereof, the following components (a)–(e):

(a) a polyvinyl chloride base resin produced by suspension polymerization and/or bulk polymerization;

(b) a super high molecular acrylic resin base processing aid;

(c) a stabilizer containing one or more Group-II and/or Group-IV metals;

(d) a surfactant; and (e) a heat-decomposable organic foaming agent.

In another aspect of this invention, there is also provided a hard polyvinyl chloride resin open-cell foam formed by extrusion from the above composition.

Accordingly to the present invention, an open-cell foam of a hard PVC-base resin can be obtained easily and efficiently by extrusion in spite of the fact that the extrusion of such a foam has heretofore been believed to be impractical.

When obtaining such an open-cell foam by extrusion, it is preferable to use such a composition that contains a PVC-base resin having an average polymerization degree of 300–800, preferably, a suspension- or bulk-polymerized PVC-base resin having an average polymerization degree of 400–700, one or more super high molecular acrylic resin base processing aids, a combination of an anionic surfactant and non-ionic surfactant or a combination of an anionic surfactant and a wax or polyolefin of a low polymerization degree, a heat-decomposable organic foaming agent such as ADCA, as if needed, an internal lubricant, filler, pigment and/or the like. It is surprising that an excellent open-cell foam made of a hard PVC-base resin is obtained owing to the combinations of the above-described components, because the above resin components are individually used by a calendering or extrusion technique in various application fields and are not novel materials in particular but when combined with the above-mentioned group of components, excellent open-cell foams can be mass-produced easily and economically.

Since open-cell foams according to this invention are composed of a hard PVC-base resin which is inherently superb in both chemical resistance and weatherability and excellent in physical properties such as tensile strength and hardness, they can be used suitably as pipes to be buried for underdrainage, slope draining piles and pipes, aeration (air diffusion) pipes for miscellaneous effluent, soil water and the like, filter materials for chemical reagents, filter materials for corrosive gases, and the like, namely, in application fields where expensive sintered ceramic or plastic bodies have heretofore been usable. The present invention can therefore provide materials which are extremely-useful and valuable for civil engineering and other industry.

BRIEF DESCRIPTION OF THE DRAWINGS

The above and other objects, features and advantages of the present invention will become apparent from the following description and the appended claims taken in conjunction with the accompanying drawings, in which:

DETAILED DESCRIPTION OF THE INVENTION AND PREFERRED EMBODIMENTS

Figure 1:
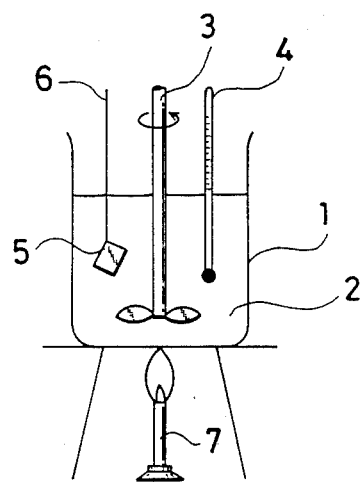
FIG. 1 is a schematic illustration of an apparatus employed to investigate foaming temperature characteristics.

The PVC-base resin useful in the practice of this invention is a PVC-base resin obtained by so-called suspension polymerization and/or bulk polymerization. It has heretofore been used primarily by calendering or extrusion. Emulsion-polymerized PVC-base resins which have conventionally been used by coating techniques, namely, paste-formulating PVC-base resins are not suited for the purposes of the present invention.

The term "PVC-base resin" as used herein means not only polyvinyl chloride straight polymer (homopolymer of vinyl chloride) obtained by suspension polymerization and/or bulk polymerization but also polymers containing vinyl chloride as a principal component, such as vinyl chloride-vinyl acetate copolymers, vinyl chloride-ethylene copolymers and ethylene-vinyl acetate-vinyl chloride terpolymers. Needless to say, these PVC-base resins may be used either singly or in combination, namely, as a mixed resin system in actual applications. No particular limitation is imposed on this aspect.

It is extremely important in the present invention to choose a suitable polymerization degree with respect to the above-mentioned PVC-base resin, since the flow characteristics of the PVC-base resin vary considerably depending on its polymerization degree, variations in the flow characteristics lead to variations in melt viscosity ($\times 10^3$ poises) under high-temperature (180° C.) and constant-load (70 kg) conditions, and the polymerization degree is hence related closely to the formation of open cells in the PVC-base resin upon its extrusion. Although this melt viscosity is also affected by the type and amount of a processing aid employed along with the PVC-base resin, the type of a stabilizer and other components (for example, surfactant, lubricant, filler, etc.), it is the polymerization degree of the PVC-base resin that is most dominant.

PVC-base resins of various grades are available on the market, ranging widely from low polymerization degree resins having an average polymerization degree of 300–600 to high (super high) polymerization degree resins having an average polymerization degree of 3,000–6,000. For the composition and open-cell foam of this invention, it is preferred to use a PVC-base resin having an average polymerization degree of 300–800, more preferably, that having an average polymerization degree of 400–700. Those having a polymerization degree higher than the upper limit, for example, those having an average polymerization degree on the order of 1,000 and being available on the market result in poor resin flow characteristics (the state and rate of discharge) upon extrusion and lead further to products having inferior external appearance and open-cell structure. This may be attributed to the possible mismatching between the melt viscosity increased due to the increased polymerization degree of the resin and the decomposition temperature of an associated foaming agent. If a higher heating temperature is used upon kneading and forming the resin with a view toward reducing the melt viscosity of the resin, the decomposition of the foaming agent is however accelerated and moreover, an abnormally high temperature occurs within the extruder thereby to deteriorate the resin. It is hence not preferred to use such a high heating temperature.

Upon choosing the polymerization degree of the PVC-base resin, it is also necessary to take into parallel consideration the stabilizer to be used in combination with the PVC-base resin. In the invention of Japanese Patent Application No. 251325/1986 filed previously by the present inventors, a K-Zn type liquid stabilizer is used as a stabilizer. In this case, a resin having an average polymerization degree of 700 is most suitable. A resin of a polymerization degree as low as 400–500 cannot be used singly (causes cell irregularity and results in an extruded article having extremely poor external appearance). Such a resin is usable only as a processing aid for a resin having an average polymerization degree of 700. In the present invention, a stabilizer containing Group-II and/or Group-IV metals is used as a stabilizer as will be described subsequently. The selection of such a stabilizer has made it possible to use a wide range of PVC-base resins the average polymerization degrees of which range from 300 to 800.

In the composition and open-cell foam of this invention, it is an extremely important feature to use a processing aid (which may also be called "modifier") in combination. Its selection is also an extremely important factor for the attainment of the objects of this invention.

In general, processing aids (or modifiers) for PVC-base resins may be classified roughly into the following groups:

(1) processing aids composed principally of a butadiene base resin such as ABS or MBS;

(2) processing aids composed principally of an olefin resin such as polyethylene, chlorinated polyethylene (CPE) or ethylene-vinyl acetate copolymer (EVA);

(3) processing aids composed principally of an acrylic ester base resin (RA) or methacrylic ester base resin (RMA);

(4) processing aids composed principally of a condensation resin; and (5) others.

The processing aids (1) are used mainly for the modification of the impact resistance of hard PVC-base resin products. ABS, MBS and the like are well-known. They are however not suitable as processing aids for compositions and open-cell foams of this invention. If ABS or MBS is employed in combination for the preparation of a composition of this invention or for the production of an open-cell foam of this invention, the intended open-cell foam cannot be obtained at all although such a modifier is effective certainly for the production of a formed article of modified impact resistance. This may probably be attributed to the fact that the rubber component out of the components copolymerized (or graft-polymerized) as ABS, MBS or the like is present unevenly in the melt of a PVC base resin.

Among the processing aids (2), CPE is particularly effective for compositions and open-cell foams according to this invention. Although EVA has been found to show some effects, its effects are synergistic or complementary effects brought about owing to its combined use with an acrylic resin base processing air, especially, a super high molecular acrylic resin base processing resin. When used singly, EVA-base processing aids cannot provide excellent open-cell articles.

As CPEs effective in the present invention, may be mentioned "ELASLEN 301A", "ELASLEN 401A" and "ELASLEN 351A" (trade names; products of Showa Denko K.K.), "DAISOLAC G-235" and "DAISOLAC H-135" (trade names; product of Osaka Soda Co., Ltd.), etc. As EVA, "SOARBLEN GI" (trade name; product of The Nippon Synthetic Chemical Industry Co., Ltd.) is effective.

The processing aids (3) are called "acrylic resin base processing aids" collectively. They have been used primarily to improve the processability of resins, to improve the impact resistance of formed articles, to impart matting effects, to improve the surfaces of molded articles, etc. As exemplary improvements to the processability in extrusion forming (and blow molding), the following effects have been reported:
(1) improved surface gloss;
(2) torque reduction in extruders;
(3) prevention of detention-related deterioration;
(4) prevention of drawdown (sagging);
(5) increased hot melt strength; and
(5) increased discharge rate.

Illustrative examples of these acrylic resin base processing aids may include "Methablen P-501" and "Methablen P-551" (trade names; products of Mitsubishi Rayon Co., Ltd.), "KANE ACE PA-11" and "KANE ACE PA-20" (trade names; products of Kanegafuchi Chemical Industry Co., Ltd.), "HIBLEN 401" and "HIBLEN 402" (trade names; products of Nippon Zeon Co., Ltd.), "BTA-101" (trade name; product of Kureha Chemical Industry Co., Ltd.), "Acryloid K-120N", "Acryloid K-120ND", "Acryloid K-125" and "Acryloid K-147" (trade names; products of Rhom & Haas Company), etc. These conventional acrylic resin base processing aids are however not effective as processing aids in the present invention when they are used singly. Like CPE and EVA mentioned above, they can act effectively, namely, can provide synergistic or complementary effects when combined with a super high molecular acrylic resin base processing aid.

Processing aids effective in this invention are super high molecular weight acrylic resin base processing aids. As its specific commercial products, may be mentioned by way of example "Methablen P-530" and "Methablen P-531" (trade names; products of Mitsubishi Rayon Co., Ltd.) and "KANE ACE PA-50" (trade name; product of Kanegafuchi Chemical Industry Co., Ltd.), with "Methablen P-530" and "Methablen P-531" being particularly effective.

According to a catalogue of Mitsubishi Rayon Co., Ltd., "Methablen P-530" which is a super high molecular acrylic resin base processing aid is described to have the following properties:
apparent specific gravity: 0.35 g/cc,
true specific gravity: 1.15 g/cc,
particle size: 30 mesh pass—at least 98%,
volatile components: 1.0% or less, and
color: white;
and is said to exhibit the following advantageous effects;
(1) promotion of gelation,
(2) facilitation of foam extrusion forming,
(3) facilitation of the foaming of soft leathers,
(4) facilitation of the calendering of soft leathers,
(5) improvements to secondary formability or moldability,
(6) improvements to the formability or moldability of formed or molded articles having a high filler content,
(7) improvements to injection moldability, especially, to jetting, and
(8) prevention of gumming upon extrusion forming.

Concerning the effect (2) "facilitation of foam extrusion forming" in particular, it is pointed out that upon foam extrusion forming of a hard PVC-base resin, high-temperature and high-degree foamability can be retained and uniform cells can be formed.

These advantageous effects are also exhibited fully in the composition and open-cell foam of this invention. It shows excellent effects, particularly, when used in combination with CPE. It may hence be considered as the most suitable processing aid in the practice of this invention.

The distinction between super high molecular acrylic resin base processing aids and usual acrylic resin base processing aids depends on their molecular weights. The molecular weights of usual acrylic resin base processing aids range from 300,000 to 500,000, while the term "super high molecular weight acrylic resin base processing aids" means those having a molecular weight of about 1,000,000 or higher, preferably, 1,500,000 or higher. Upon practice of this invention, a processing aid should therefore be chosen using these molecular weight ranges as a criterion.

The amount of a processing aid to be added varies depending which one of CPE, a usual acrylic resin base processing aid and a super high molecular acrylic resin base processing aid the processing aid is. Although the former two processing aids are not effective in obtaining an excellent open-cell foam when used singly, they can bring about synergistic or complementary effects when employed in combination with the super high molecular acrylic resin base processing aid. CPE and the usual acrylic resin base processing aid however take different roles and they are hence added in different amounts.

Namely, CPE is effective in lowering the melt viscosity of the PVC-base resin suitably so as to facilitate the formation of cells upon decomposition of the foaming agent. It is therefore added in a relatively large amount, namely, in an amount of 5–20 phr ("phr" means parts by weight added per 100 parts by weight of the PVC-base resin. The same definition will hereinafter be applied). When an EVA-base modifier is used instead of CPE, the EVA-base modifier may be added in a similar amount.

On the other hand, a usual acrylic resin base processing aid such as "Methablen P-501" is effective in imparting smoothness and gloss to the surface of an extrusion-formed article. It can exhibit its effect satisfactorily when incorporated in an amount of 1-3 phr or so. Such a usual acrylic resin base processing aid is however not required when CPE is used. Its combined use is effective when an EVA-base modifier is used.

In contrast, the super high molecular acrylic resin base processing aid is effective in forming fine and uniform cells by the decomposition of the foaming agent and hence in increasing the expansion ratio. It may be used in a range of from 2 to 15 phr.

The stabilizer useful in the practice of this invention is extremely specific and characteristic. In the aforementioned conventional inventions, an alkali metal-Zn type stabilizer or a stabilizer containing both Group-I and Group-II metals of the periodic table is used. These stabilizers are however very poor in thermal characteristics, especially, thermodynamic characteristics in the present invention. This drawback has been known for many years as the most serious drawback of stabilizers which contain an alkali metal, namely, a Group-I metal of the periodic table. They may be used without problems in paste-like compositions as disclosed in Japanese Patent Publication No. 21898/1978 and U.S. Pat. No. 4,226,943, but their dynamic heat resistance has been considered to develop problems when processed with heating and kneading as in Japanese Patent Publication Nos. 50662/1983, 25369/1983 and 58370/1983. In compositions containing one or more of these stabilizers, the most serious problem is heat deterioration which their resins undergo upon kneading. This heat deterioration is accompanied by discoloration of the resins and their baking on roll surfaces. In some extreme cases, resins may be turned into a black color, may give off offensive odor and may cause corrosion of roll surfaces. These problems are aggravated if such a stabilizer is incorporated in the hard PVC-base resin composition of this invention. Accordingly, it was often indispensable in the above-described invention of Japanese Patent Application No. 251325/1986 to add an ultra heat-resistant stabilizer such as tin mercaptide in an amount not impairing the open-cell formability of a stabilizer, which contained both Group-I and Group-II metals of the periodic table, whenever the latter stabilizer was used. This tin-type stabilizer is however very costly and moreover, it was added in a relatively large amount, i.e., at a level of 2-3 phr. The combined use of such an ultra heat-resistant stabilizer hence resulted in a cumbersome process and economical disadvantage.

With the foregoing in view, the present inventors carried out an extensive investigation in order to solve the drawbacks of these stabilizers. As a result, it was found that a stabilizer containing Group-II and/or Group-IV metals of the periodic table shows excellent applicability as a stabilizer for the composition and open-cell foam of this invention.

As Group-II metals of the periodic table, nine metals are known in general, namely, beryllium (Be), magnesium (Mg), calcium (Ca), strontium (Sr), barium (Ba), radium (Ra), zinc (Zn), cadmium (Cd) and mercury (Hg). Of these, five metals, i.e., Cd, Ba, Zn, Ca and Mg have been used for any years as stabilizer components. As Group-IV metals of the periodic table on the other hand, six metals are known in general, namely, silicon (Si), germanium (Ge), tin (Sn), lead (Pb), titanium (Ti) and zirconium (Zr). Among these, two metals, i.e., Sn and Pb have been known very well as stabilizer components. Stabilizers containing one or more of these Group-II and Group-IV metals of the periodic table, e.g., Cd, Ba, Zn, Ca, Mg, Sn and/or Pb as metal components have been used for many years in PVC-base resins and are known to impart superior heat resistance and weatherability to stabilizers containing a group-I metal such as potassium (K) or sodium (Na). Accordingly, they are still used as stabilizers in PVC-base resin compounds for various application purposes, hard PVC-resin pipes and pipe joints, hard films and the like. It is surprising that such general stabilizers are effective for the composition and open-cell foam of this invention and moreover, some of the stabilizers may be used singly, certain two or more Group-II metal type stabilizers may be used as a mixture (or in a composite form), certain Group-II metal type stabilizer or stabilizers and Group-IV metal type stabilizer or stabilizers may be used in combination, or some two or more Group-IV metal type stabilizers may be used as a mixture. This is a novel technical concept which has completely overthrown the aforementioned conventional technical concept, and the merits of this invention in both composition and economy are believed to be extremely significant.

In the case of Pb which is a Group-IV metal, Pb-containing stabilizers may be classified into lead salt type stabilizers and lead soap type stabilizers as will be shown below in Table 1. Since lead salt type stabilizers do not have lubricity by themselves, excellent open-cell foams can be obtained when they are used in combination with a wax as a substitute for a non-ionic surfactant. In the case of lead soap type stabilizers on the other hand, they have strong lubricative effects by themselves. By choosing a lubricant conforming the above-mentioned property of a lead soap type stabilizer, superb open-cell foams can be obtained.

TABLE 1

| | State | Lead content | Specific gravity |
|---|---|---|---|
| Lead salt type stabilizer | | | |
| White lead [2PbCO$_3$.Pb(OH)$_2$] | White powder | 86.8% | 6.7 |
| Basic lead sulfite [nPbO.PbSO$_3$] | White powder | 85.8% | 7.5 |
| Tribasic lead sulfate [3PbO.PbSO$_4$.H$_2$O] | White powder | 83.6% | 7.1 |
| Dibasic lead Phosphite [2PbO.PbHPO$_3$.½H$_2$O] | White powder | 83.7% | 6.9 |
| Dibasic lead Phthalate [2PbO.Pb(C$_8$H$_4$O$_4$)] | White powder | 76.0% | 4.6 |
| Co-precipitated lead silicate and silica gel [PbSiO$_3$.mSiO$_2$] | White powder | 43-64% | 3.0-4.1 |
| Lead soap type stabilizer | | | |
| Lead stearate [Pb(C$_{17}$H$_{35}$COO)$_2$] | White powder | 27.5% | 1.4 |
| Dibasic lead stearate [2PbO.Pb(C$_{17}$H$_{35}$COO)$_2$] | White powder | 51.5% | 2.0 |

Among the lead salt type stabilizers, dibasic lead sulfite (called "L-FOS" generally), tribasic lead sulfate (called "TS" generally) and white lead show excellent applicability in particular.

An "alkali metal-Zn" type stabilizer and an "alkali metal-(Zn+Sn)" type stabilizer, which are employed in the various prior inventions described above, will be compared in heat resistance with the above-mentioned L-FOS in Table 2.

A comparison was made in heat resistance among an example (Comparative Example 1) in which in the composition of Example 1 of this invention to be described subsequently, 2 phr of an "alkali metal-Zn" type stabilizer (product of Adeka Argus Chemical Co., Ltd.; "Mark FL-30", trade name; liquid stabilizer) instead of the stabilizer (L-FOS) employed there, another example (Comparative Example 2) in which 2 phr of "Mark FL-30" described above and 2 phr of an Sn-type stabilizer (product of Katsuta Kako K.K.; "Advastab TM-181 FSJ", trade name; Sn mercaptide type liquid stabilizer) were used, and the subsequent Example 1 as a further example (Invention).

It will be understood from Table 2 that L-FOS can impart far superior thermal stability to the stabilizers employed in the Comparative Examples. These lead salt type stabilizers may be used either singly or in combination in the present invention. The combined use of L-FOS and TS can give excellent results, especially, in the present invention.

TABLE 2

| Composition | Heat resistance | |
|---|---|---|
| | 160° C. | 170° C. |
| Comp. Ex. 1 | Discolored in 10 minutes, and gave off offensive odor in 45 minutes | |
| Comp. Ex. 2 | Stable for 60 minutes | Discolored and gave off offensive odor in 25 minutes |
| This invention | Stable for 60 minutes | Stable for 60 minutes |

Incidentally, the above heat resistance test was carried out by separately kneading the individual compositions at each of the above temperatures by means of rolls of 9 inches across and 20 inches long to wrap the compositions separately on the rolls (thickness: 0.4 mm), sampling the compositions on every fifth minute and then observing their state.

Known as exemplary composite stabilizer systems of two or more Group-II metals of the periodic table are "Advastab BC-1000J" (trade name; liquid Cd-Ba type; product of Katsuta Kako K.K.), "Advastab DB-54G" (trade name; powdery Cd-Ba type; product of Katsuta Kako K.K.), "Mark AC-186" (trade name; liquid Ba-Zn type; Adeka Argus Chemical Co., Ltd.), "Mark OF-19" (trade name; powdery Ba-Zn type; Adeka Argus Chemical Co., Ltd.), "Mark AC-116" (trade name; liquid Ca-Zn type; Adeka Argus Chemical Co., Ltd.), "Mark SP-55" (trade name; powdery Ca-Zn type; Adeka Argus Chemical Co., Ltd.), "Mark AC-113" (trade name; liquid Mg-Zn type; Adeka Argus Chemical Co., Ltd.), "Mark OF-30" (trade name; powdery Mg-Zn type; Adeka Argus Chemical Co., Ltd.), etc. They have extremely good applicability as stabilizers for compositions and open-cell foams of the present invention.

As lead type stabilizers among stabilizers composed of one or more Group-IV metals of the periodic table, the stabilizers shown above in Table 1 are useful. As tin type stabilizers, may be effectively used general liquid tin type stabilizers such as "Advastab TM-181FSJ" (trade name; tin mercaptide type stabilizer; product of Katsuta Kako K.K.), "Advastab T-12PJ" (trade name; dibutyltin dilaurate; product of Katsuta Kako K.K.) and "Advastab T-18J" (trade name; dibutyltin maleate; product of Katsuta Kako K.K.).

The above-described various metal-containing stabilizers either accelerate or on the contrary, decelerate (or retard) the decomposition of a foaming agent. In general, Pb type and Cd type stabilizers accelerate the decomposition of a foaming agent, while Sn type stabilizers retard its decomposition. It is hence a surprising advantage whatsoever unavailable from any conventional K-Zn type or Na-Zn type stabilizers that where temperature conditions for the gelation of a resin and the decomposition temperature of a foaming agent do not conform, the decomposition temperature of the foaming agent can be brought into conformity with the temperature conditions for the gelation of the resin by suitably combining one or more of the above accelerating stabilizers and one or more of the above decelerating stabilizers.

Regarding the manner of use of tin type stabilizers, the decomposition temperature of a foaming agent is higher by about 5° C.–10° C. in the case of Ca-Zn-Sn type stabilizers compared with Ca-Zn type stabilizers. This suggests the effectiveness of a Ca-Zn-Sn type stabilizer as an appropriate stabilizer where a PVC-base resin has a high polymerization degree. The decomposition temperature of a foaming agent is higher by as much as 15° C. when an Sn type stabilizer is used as a sole stabilizer, compared with the decomposition temperature of the same foaming agent when a Cd-Ba type stabilizer is used. This suggests that the range of usable PVC-base resins can be broadened significantly.

The amount of a lead salt type stabilizer to be used in the present invention may range from 1.0 to 5.0 phr, more suitably, from 1.5 to 2.5 phr. If such a lead salt type stabilizer is added in any amount greater than 5.0 phr, the decomposition of an associated foaming agent may be accelerated too much depending on the type(s) of metal(s) contained so that a gas release from a formed article could be observed upon discharge of the formed article out of an extruder, thereby failing to obtain a homogeneous open-cell foam of high quality. Any amounts smaller than 1.0 phr are too little to improve the heat resistance of a PVC-base resin composition, whereby open-cell foams of this invention cannot be obtained stably.

On the other hand, an addition of a lead soap type stabilizer in a small amount ranging from 0.1 to 0.5 phr is effective in improving the extrusion characteristics of the PVC-base resin composition of this invention. However, this effect should not be considered to be available by the addition of the lead soap type stabilizer only. It should be taken as the "utilization of lubricity" of a metal soap type stabilizer. Since a metal soap type lubricant gives significant influence to a PVC-base resin composition unlike a non-ionic surfactant or a low polymerization-degree polyolefin or wax as a substitute for the non-ionic surfactant, care should be exercised upon its selection and determination of its use amount.

The foaming temperature conditions vary considerably depending on the type(s) of metal(s) contained in a stabilizer to be used in the present invention or on the types of metals combined (or mixed) in a composite stabilizer which is to be used in the present invention. In order to investigate easily these temperature characteristics with a view toward determining their usefulness (namely, whether they may be used as temperature conditions for actual extrusion processing), the temperature characteristics were measured in the following manner by using such an apparatus as illustrated in FIG. 1.

Compositions identical to the composition of Example 1 to be described subsequently in Table 5 except for the substitution of corresponding stabilizers in Table 3 for the stabilizer of the composition of Example 1 were separately kneaded at 140° C. for 10 minutes on a test roll, so that they were formed separately into sheets of 0.5 mm thick. Those sheets were then cut into samples of 10×30 mm. About 160 ml of silicone oil ("TSF-433", trade name; product of Toshiba Silicone Co., Ltd.) was placed in a 200-ml beaker. The silicone oil was heated by a gas burner to a temperature determined in advance. Each of the samples was immersed for exactly 1 minute in the silicone oil of the predetermined temperature and was then pulled out immediately. After allowing the sample to cool down, it was cut to observe and record the state of its foaming. Results are summarized in Table 3.

surfactant. It is hence a preferred requisite to use both surfactants in combination.

As illustrative examples of the anionic surfactant useful in the practice of this invention, may be mentioned higher fatty acid salts, secondary higher fatty acid salts, salts of higher alkyl dicarboxylates, salts of the sulfuric esters of primary higher alcohols, salts of the sulfuric esters of secondary higher alcohols, primary alkylsulfonic acid salts, secondary alkylsulfonic acid salts, salts of higher alkyl disulfonates, sulfated fatty acids and salts thereof, sulfonated higher fatty acid salts, salts of high alkyl phosphates, salts of the sulfuric

TABLE 3

| Kind of stabilizer | Amount added (phr) | Oil bath temperature (°C.) | | | | | |
|---|---|---|---|---|---|---|---|
| | | 170 | 175 | 180 | 185 | 190 | 195 |
| (Pb type) | | | | | | | |
| L-FOS[1] | 2.0 | Δ | Δ | O | ◎ | | |
| TS | 2.0 | Δ | Δ | O | ◎ | | |
| White lead | 2.0 | X | Δ | O | ◎ | | |
| PL | 2.0 | O | O | ◎ | | | |
| Sil-L | 2.0 | X | X | O | ◎ | | |
| (K—Zn type + Sn type) | | | | | | | |
| FL-30[2] | 3.0 | Δ | O | ◎ | | | |
| FL-30 TM181FSJ[3] | 3.0 2.0 | X | X | Δ | O | ◎ | |
| (Cd—Ba type) | | | | | | | |
| BC-1000J[4] | 3.0 | Δ | O | O | ◎ | | |
| DB-54G[5] | 3.0 | Δ | O | ◎ | | | |
| (Ca—Zn type + Sn type) | | | | | | | |
| SP-55[6] | 3.0 | X | O | O | ◎ | | |
| SP-55 TM181FSJ | 3.0 2.0 | X | X | Δ | O | ◎ | |
| AC-116[7] | 3.0 | X | Δ | Δ | ◎ | | |
| AC-116 TM181FSJ | 3.0 2.0 | X | X | X | O | ◎ | |
| (Ba—Zn type) | | | | | | | |
| OF-19[8] | 3.0 | X | X | O | O | ◎ | |
| AC-186[9] | 3.0 | X | Δ | Δ | ◎ | | |
| (Mg—Zn type + Sn type) | | | | | | | |
| OF-30[10] | 3.0 | Δ | O | ◎ | | | |
| OF-30 TM181FSJ | 3.0 2.0 | Δ | Δ | O | ◎ | | |
| AC-113[11] | 3.0 | X | X | Δ | ◎ | | |
| AC-113 TM181FSJ | 3.0 2.0 | X | X | Δ | Δ | O | ◎ |
| (Sn type) | | | | | | | |
| TM181FSJ | 2.0 | X | X | X | Δ | O | ◎ |
| T-12PJ[12] | 1.0 | X | X | Δ | O | ◎ | |
| T-18J[13] | 1.0 | | | | | | |

(Note)
Evaluation standard of foamability
X: No changes.
Δ: Bubbles observed.
O: Foaming started.
◎: Cells formed throughout the sample.
[1]Trade name; lead salt type stabilizer (powder) produced by Katsuta Kako K.K.
[2]Trade name; stabilizer (liquid) produced by Adeka Argus Chemical Co., Ltd.
[3]Trade name; tin mercaptide (liquid) produced by Katsuta Kako K.K.
[4]Trade name; stabilizer (liquid) produced by Katsuta Kako K.K.
[5]Trade name; stabilizer (powder) produced by Katsuta Kako K.K.
[6]Trade name; stabilizer (powder) produced by Adeka Argus Chemical Co., Ltd.
[7]Trade name; stabilizer (liquid) produced by Adeka Argus Chemical Co., Ltd.
[8]Trade name; stabilizer (powder) produced by Adeka Argus Chemical Co., Ltd.
[9]Trade name; stabilizer (liquid) produced by Adeka Argus Chemical Co., Ltd.
[10]Trade name; stabilizer (powder) produced by Adeka Argus Chemical Co., Ltd.
[11]Trade name; stabilizer (liquid) produced by Adeka Argus Chemical Co., Ltd.
[12]Trade name; stabilizer (liquid) produced by Katsuta Kako K.K.
[13]Trade name; stabilizer (liquid) produced by Katsuta Kako K.K.

Like the selection of a stabilizer, it is also an extremely important feature to use a surfactant in the present invention. It is a preferred requirement to use both anionic surfactant and non-ionic surfactant in combination. In contrast, the single use of an anionic surfactant cannot provide any excellent formed open-cell article. This also applies to the sole use of a non-ionic esters of higher fatty acid esters, the sulfonates of higher fatty acid esters, condensation products of higher fatty acids and proteolytic amino acids, condensation products of higher fatty acids and amino acids, salts of alkylol sulfuric acid ester of higher fatty amides, alkylsulfonates of higher fatty amides, alkylcarboxylates of higher alkylsulfonamides, sulfosuccinic esters, alkylbenzenesulfonates, alkylphenolsulfonates, alkylnaphthalenesulfonates, condensation products of alkylnaphthalenesulfonic acids and formaldehyde, sulfonates of alkyldiphenyls and other polycyclic compounds, ketone compounds of alkylallylsulfonates, petroleum sulfonates, etc.

As exemplary non-ionic surfactants, may be mentioned glycerides, the glycol esters of fatty acids, the pentaerythritol esters of fatty acids, the sucrose esters of fatty acids, the sorbitan and mannitan esters of fatty acids, condensation products of higher alcohols, condensation products of higher fatty acids, condensation products of higher alkylamines, condensation products of higher fatty amides, condensation products of higher alkyl mercaptans, condensation products of alkylphenols, condensation products of polypropylene oxides, and so on.

As commercially-available examples of these surfactants, may be mentioned "LIPOLAN 1400" (trade name; α-olefinsulfonate; product of Lion Corporation) as an anionic surfactant and "LIPONOX NC-2Y" (trade name; polyoxyethylenealkyl aryl ether; product of Lion Corporation). They are both extremely useful as surfactants for compositions and hard open-cell foams according to the present invention.

In the case of a non-ionic surfactant, it may be replaced by a polyolefin such as liquid polypropylene or low polymerization-degree polyethylene or by a wax. It is surprising that open-cell foams of this invention obtained by using such a substitute are by no means inferior to those obtained by using a non-ionic surfactant and the above substitution does not develop any process-related problems. Needless to say, such a substitute should also be used in combination with an anionic surfactant.

As an exemplary liquid polypropylene, may be mentioned "LPP-N108" (trade name; product of Ube Industries, Ltd.). On the other hand, illustrative of the low polymerization-degree polyethylene may include "SANWAX" (trade name; decomposition product of high molecular polyethylene; product of Sanyo Chemical Industries, Ltd.), "NEOWAX" (trade name; polyethylene byproduct; product of Yasuhara Yushi Kogyo Co., Ltd.), "Mitsui Hi-Wax" (trade name; low polymerization-degree polyethylene; product of Mitsui Petrochemical Industries, Ltd.), etc. They are all usable in the present invention.

As exemplary waxes, may be mentioned plant waxes such as candelilla wax, carnauba wax, rice wax, haze wax and jojoba oil; animal waxes such as bees wax, lanolin (hydrous wool fat) and whale wax; mineral waxes such as montan wax, ozocerite and ceresin; petroleum waxes such as paraffin wax, microcrystalline wax (micro wax) and petrolatam; coal-type synthetic waxes such as acid waxes making use of montan wax as a base, ester waxes and partially-saponified ester waxes; Fisher-Tropsch wax known as SASOL wax; hydrogenated castor oil; 12-hydroxystearic acid and its derivatives; amide type waxes such as $C_8$-$C_{22}$ saturated fatty amides, unsaturated fatty amides, hydroxy fatty amides, N-methylolfatty amides, N,N'-methylenefatty amides and N,N'-ethylenefatty amides; ketone type waxes such as diheptadecyl ketone and diundecyl ketone; fatty acid esters of monohydric alcohols and polyhydric alcohols; etc. Among these, may be used suitably "Hoechest Wax OP" (trade mark; product of Hoechst Japan, Ltd.) as a partially-saponified ester wax of montanic acid, "Nisseki Microwax 155" and "Nisseki Microwax 180" (trade mark; product of Nippon Oil Co., Ltd.) as microwaxes, "Hoechst Wax GL-3" (trade mark; product of Hoechst Japan, Ltd.) as a Fisher-Tropsch wax, and the like.

These surfactants and low polymerization-degree polyolefins or waxes may each be used generally in an amount of 0.5-5.0 phr, with a range of 1.0-3.0 phr being suitable.

It is also an important requirement in this invention to add a foaming agent. A general heat-decomposable organic foaming agent may be used suitably in the present invention. Illustrative of the foaming agent may include azodicarbonamide (ADCA), dinitrosopentamethylenetetramine (DPT), paratoluenesulfonyl hydrazide (TSH), 4,4'-oxybisbenzenesulfonyl hydrazide (OBSH), azobisisobutylonitrile (AIBN), etc. Either single or combined use of ADCA and OBSH is extremely useful for the practice of this invention.

These heat-decomposable organic foaming agents have conventionally been used for foaming PVC-base resins, polyethylene, EVA, polystyrene and various rubber products. Their foamed products are all closed-cell foams. In the case of a PVC-base resin, it is usually possible to obtain only closed-cell foams no matter whether it is an emulsion polymer or suspension polymer. Although open-cell foams are obtained in the above-mentioned Japanese Patent Publication Nos. 25369/1983 and 58370/1983, each of their compositions contains a plasticizer in a large amount, i.e., is of the soft type, and can provide sheet-like foams only. Moreover, they are dependent on a two-stage foaming process in which a resin composition is first formed into an unfoamed sheet-like shape and the thus-formed sheet is then caused to travel through a foam oven to foam same. There has been absolutely no example of prior use that like the present invention, a formed article such as pipe or plate-like member was obtained by extrusion from a hard-type composition in accordance with a one-stage process and moreover as an open-cell foam.

The amount of the heat-decomposable organic foaming agent to be added in the present invention varies depending on the type of the composition composed of a PVC-base resin, processing aid, stabilizer and surfactant, an expansion ratio and air permeability desired for an article to be formed or molded, etc. It is generally in a range of from 0.5 to 10.0 phr with a range of from 1.0 to 3.0 phr being preferred.

In the case of compositions and hard open-cell foams according to this invention, it is often effective to add a powdery filler such as calcium carbonate. Such a powdery filler acts as an aid which promotes release and/or diffusion of a decomposition gas occurred from the foaming agent. Compared with a composition not added with such a powdery filler, the composition added with such a powdery filler is better in the uniformity of open cells and stability of air permeability.

In addition to calcium carbonate mentioned above by way of example, talc, silica, aluminum hydroxide, finely-comminuted woodmeal and the like may be used as powdery fillers. These powdery fillers may be added in an amount ranging from about 1.0 to about 50.0 phr, preferably, from about 5.0 phr to 15.0 phr. Care should be taken to avoid the addition of such a powdery filler in any unduly large amount, because its excess addition impairs the uniform foamability and the quality of open cells of an article to be formed or molded.

Since extrusion is practised as a forming method in the case of a composition and hard open-cell foam according to this invention, it is also important to design the lubricity of the composition. The non-ionic surfactant or the low polymerization-degree polyolefin or was as a substitute for the non-ionic surfactant also has lubricity by itself. Their function as lubricants is effective as external lubricants but is not satisfactory as internal lubricants. It is hence preferable to add an internal lubricant such as fatty acid ester of a polyhydric alcohol in the present invention. For example, "Loxiol G-12" and "Loxiol G-16" (trade names; products of Henkel Hakusui Corporation) and the like are useful.

In the present invention, it is also possible to add a metal oxide, for example, zinc oxide or the like as needed in order to adjust the thermal decomposition temperature of a heat-decomposable organic foaming agent. Such a metal oxide is effective especially for compositions containing an Sn type stabilizer.

Further, it is often useful in the present invention to add a plasticizer such as DOP, BBP or TCP in a small amount as a method for enhancing the internal lubricity. The addition of such a plasticizer is effective not only in enhancing the internal lubricity but also in increasing the strength of formed cells. In the case of a composition added, for example, with 3.0 phr of "Advastab BC-1000" as a Cd-Ba type liquid stabilizer, resulting foams contain hollow cavities. This is attributed to the fact that the cell strength of the molten resin is weak upon its foaming. This problem can however be solved by the addition of 2.0 phr of DOP.

An organic acid anhydride such as trimellitic anhydride is effective in raising the foaming temperature of the above-mentioned heat-decmposable foaming agent, in other words, in retarding its foaming. When it is added to a composition which has been added with a metal type stabilizer having strong foaming-promoting effects such as Pb type, Cd-type or Mg-Zn type stabilizer, the decomposition of the foaming agent is rendered mild so that an excellent open-cell foam can be obtained. Such an organic acid anhydride may be added in an amount of 0.1–2.0 phr, more preferably, 0.3–1.0 phr.

In the present invention, one or more coloring pigments such as titanium oxide, carbon black, chrome yellow and/or Watchung red may be added as needed and suitably. Conditions for decomposing a foaming agent in a composition so as to foam the composition are however changed when an iron compound pigment such as red oxide is used. Such an iron compound pigment should therefore be used after conducting an experiment beforehand and confirming whether the processing conditions are changed or not.

Both essential and optional components such as those described above, which constitute a PVC-base resin composition according to this invention, are proportioned respectively in accordance with characteristic properties required for an intended formed or molded article, such as desired shape (pipe, plate, rod, or the like), expansion ratio and air permeability of the intended formed or molded article and are then mixed and agitated in a high-speed mixing apparatus, for example, Henschel mixer or the like.

This mixing and agitating step is a very important step for obtaining a uniform composition of this invention. The composition is required to have a high degree of uniformity in order to permit smooth feeding of the composition upon supplying the composition from a hopper to an extruder when the composition is formed by extrusion. Such a high degree of uniformity is also required to maintain in a stable state the discharge of the composition from the extruder so as to avoid variations in expansion ratio and air permeability among resulting products.

The agitation in the Henschel mixer may preferably be carried out within a temperature range of 80°–110° C. Within this temperature range, components such as surfactant, wax and lubricant are dissolved and are dispersed and absorbed evenly in the PVC-base resin. Further, agglomerates of particles of the foaming agent are also dispersed and the thus-dispersed fine particles of the foaming agent form, as discrete particles, a uniformly-mixed state with the resin component. No problems arise for the attainment of the above uniformly-mixed state, because the partial gelation of the resin and/or thermal decomposition of the foaming agent do not occur at all within the above temperature range.

As a matter of fact, the powder composition which has been heated to 80°–110° C. is charged into a cooling mixer subsequent to its mixing and agitation. The cooling mixer is equipped with a cooling jacket and is cooled with cooling water. The composition is thereafter fed to a forming extruder. By this cooling step, the powder composition of this invention is rendered into a free flowing state extremely good in flowability. If the powder composition of 80°–110° C. is charged into the hopper of the extruder as is without cooling, its downward flow into the extruder is rendered instable and moreover, the resin undergoes a heat deterioration reaction due to accumulation of heat in the composition and an abnormal temperature increase takes place. As a result, the blackening of the resin and/or the thermal decomposition of the foaming agent may take place. Care should therefore be exercised.

Figure 2:
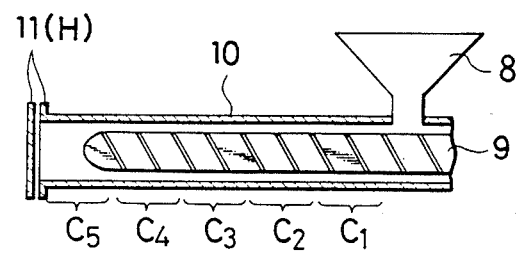
FIG. 2 illustrates one example of temperature distribution in an extruder useful in the practice of this invention.

The extruder employed for the formation of the resin composition of this invention is of the non-vent type. It may be of either single-screw or twin-screw type. Forming temperature conditions may be set as follows. Where the PVC-base resin employed in the resin composition has an average polymerization degree of 450 by way of example, the temperatures at the respective points in the cylinder shown in FIG. 2 and the revolution number of the screw (diameter: 40 mm) may be set as standard conditions in the following manner. $C_1$: 100° C., $C_2$: 120° C., $C_3$: 140° C., $C_4$: 150° C., $C_5$: 160° C., H (head portion): 170° C., and revolution number: 60 rpm.

The discharge rate (in the case of an orifice of 2 mm thick and 39 mm wide) is about 300 g/min for the powder composition of this invention which has not been subjected in advance to the above-described processing in the Henschel mixer. When the powder composition is processed in advance by heating and mixing it at 110° C. for 5 minutes and then cooling same immediately, the discharge rate increases to 450 g/min, namely, by 1.5 times the above discharge rate and moreover, the thus-increased discharge rate remains steady.

In an extrusion-formed article of this invention obtained in the above manner, cells have been collapsed by friction in surfaces which have been brought into contact with the die, so that films are formed on the surfaces. Upon measurement of the air permeability of the formed article, these films should be planed or ground off in advance by means of an electric plane, grinder or the like. This measurement of air permeability is conducted in accordance with JIS (Japanese Industrial Standard) P-8117 "Testing Method of Air Permeability of Paper Sheets and Paper Boards".

The principle of the above testing method is to measure the time (in seconds) required for 100 ml of air to pass through a material of 645 mm² wide and the to express the air permeability of the material in terms of the time. In practice, the measurement is performed by using a "Gurley Type Densometer, Model B" manufactured by Toyo Seiki Seisaku-Sho Ltd. The followings are the air permeability data of certain specific commercial products. Filter paper No. 2: 1.5–1.6 seconds, filter paper No. 3: 2.6–2.7 seconds, filter paper No. 5C: 10.6–10.7 seconds, newsprint: 22.5–24.2 seconds, glass fiber filter ("Millipore AP 20-055-00", trade name): 0.7–0.8 second.

On the other hand, the present invention can provide hard open-cell foams having air permeability in a range of 1.0–5.0 seconds. These values correspond to the air permeability of filter paper Nos. 2 and 3. Since these values may of course be changed by modifying the composition of this invention, it is possible to produce foamed products, such as plates, having desired air permeability ranging from those having air permeability comparable with that of "Millipore AP 20" or the like to that of filter paper No. 5C or the like when the foamed products of the present invention are used as filter elements.

(EXAMPLES)

The present invention will hereinafter be described more specifically by the following Examples and Comparative Examples.

[EXAMPLE 1 & COMPARATIVE EXAMPLES 1–4]

Setting the amount of a PVC-base resin at 2.5 kg, various components were proportioned in accordance with each of compositions given in Table 5. They were charged in a 9 l Henschel mixture which had been heated to 105°–110° C. in advance, and were then mixed for 5 minutes. The revolution number was 1,480 rpm. Upon an elapsed time of 5 minutes, cooling water was fed immediately and the composition was cooled for 10 minutes while mixing same at a low speed of 740 rpm, so that a powder composition of this invention having a temperature of about 40° C. was obtained. The powder composition was highly free-flowing powder whose angle of repose was around 20°.

Using the above composition, extrusion forming was carried out by means of a single-screw extruder having a screw diameter of 40 mm and equipped at the head portion (H) with a flat die of 2×39 mm ("VS40 Extruder", trade name; manufactured by Tanabe Plastic Machinery Co., Ltd.; motor: 11 KW; heater: 8.2 KW). Heating wasw controlled basically under conditions shown below in Table 4 (see FIG. 2).

A thin smooth film was formed on the surface of a plate-like formed body thus obtained. The thin film was removed by an electric plane, and a disk having a thickness of 3.0 mm and a diameter of 35 mm was then cut out from the plate-like formed body so as to mesure its air permeability. Certain characteristics of the extrudate will be shown subsequently in Table 5.

TABLE 4

| | | Example 1: | | | |
|---|---|---|---|---|---|
| $C_1$ | $C_2$ | $C_3$ | $C_4$ | $C_5$ | H |
| 100 | 120 | 140 | 150 | 160 | 170 |
| Number of screw revolutions (rpm): 60 | | | | | |

TABLE 4-continued

| | | Comparative Examples 1–4: | | | |
|---|---|---|---|---|---|
| $C_1$ | $C_2$ | $C_3$ | $C_4$ | $C_5$ | H |
| 100 | 120 | 140 | 150 | 160 | 170 |
| Number of screw revolutions (rpm): 60 | | | | | |

Note:
[1]$C_1$–$C_5$ in the above table indicate heating zones. A barrel portion extending from a point immediately downstream a hopper to another point immediately upstream the head (H) is divided approximately into 5 equal zones and eachzone can be controlled at a desired temperature.
[2]The flat die was built in the head portion.

As will become apparent from Table 5-2 to be described subsequently, extremely good results were obtained in Example 1 of the present invention in which "Methablen P-530", a super high molecular acrylic resin base processing aid, was used. In contrast, the use of the general acrylic resin base processing aids all gave impractical results except for Comparative Example 2 in which somewhat good results were exhibited. The processing aid of Comparative Example 3 is considered to have a rather high molecular weight among general acrylic resin base processing aids, but in view of the corresponding results shown in Table 5-2, it was unsuitable as a processing aid for the composition and open-cell foam of the present invention.

TABLE 5

| | Ex. | Comp. Example | | | |
|---|---|---|---|---|---|
| | 1 | 1 | 2 | 3 | 4 |
| Polyvinyl chloride[1] resin | 100 | 100 | 100 | 100 | 100 |
| ELASLEN 301A[2] | 10 | 10 | 10 | 10 | 10 |
| Processing aid: | | | | | |
| Methablen P-530[3] | 5 | — | — | — | — |
| Methablen P-501[3] | — | 5 | — | — | — |
| KANE ACE PA-20[4] | — | — | 5 | — | — |
| KANE ACE PA-50[4] | — | — | — | 5 | — |
| L-FOS[5] | 2 | 2 | 2 | 2 | 2 |
| LIPOLAN 1400[6] | 2 | 2 | 2 | 2 | 2 |
| LIPONOX NC-2Y[6] | 1 | 1 | 1 | 1 | 1 |
| Loxiol G-16[7] | 2 | 2 | 2 | 2 | 2 |
| Foaming agent: AW-9[8] | 1.5 | 1.5 | 1.5 | 1.5 | 1.5 |
| Heavy calcium[9] carbonate NS #100 | 20 | 20 | 20 | 20 | 20 |
| Characteristics: | | | | | |
| Appearance | O | XB | Δ | O | XB |
| Cell shape | O | X | Δ | Δ | X |
| Water permeability | O | O | O | Δ | O |
| Air Permeability (seconds) | 1.8 | ∞ | 5.2 | >100 | ∞ |
| Specific gravity | 0.28 | — | 0.58 | 0.70 | — |
| Viscosity ($\times 10^3$ poises) | 29.3 | 22.2 | 30.6 | 23.6 | 13.1 |

Note:
[1]Product of Chisso Corporation (average polymerization degree: 450).
[2]Chlorinated polyethylene produced by Showa Denko K.K.
[3]Products of Mitsubishi Rayon Co., Ltd. "P-501" (trade name) is a usual acrylic processing aid, while "P-530" (trade name) is a super high molecular acrylic resin base processing aid.
[4]Acrylic resin base processing aid produced by Kanegafuchi Chemical Industry Co., Ltd.
[5]Dibasic lead phosphite produced by Eishin Kasei K.K.
[6]Products of Lion Corporation. "LIPOLAN 1400" (trade name) is an anionic surfactant, whereas "LIPONOX NY-2Y" (trade name) is a non-ionic surfactant.
[7]Internal lubricant produced by Henkel Hakusui Corporation.
[8]ADCA type foaming agent produced by Eiwa Chemical Ind. Co., Ltd.
[9]Heavy calcium carbonate produced by Nitto Funka Kogyo K.K.
[10]The following standards were employed for the evaluation of the characteristics.
(1) Appearance:
Extruded articles were evaluated visually.
O: Good, Δ: Fair, XS: Shark skin, XB: Blistered locally.

TABLE 5-continued (2) Cell shape:
Sections of extruded articles were investigated visually.
O: Good, Δ: Fair, X: Poor.
(3) Water permeability:
Water colored with a red ink was dripped onto sections of extruded articles. Water permeability was judged based on the degree of its penetration.
O: Fast, Δ: Somewhat slow, X: No penetration.
(4) Air permeability:
Measured by "Gurley Type Densometer, Model B" (trade name) manufactured by Toyo Seiki Sensaku-Sho, Ltd. Load: 567 g. Air-permeated area: 645 mm$^2$.
(5) Specific gravity:
Determined by calculation.
(6) Viscosity:
Measured by "Shimadzu Flow Tester CFT-500" (trade name) manufactured by Shimadzu Seisakusho, Ltd. Load: 70 Kg. Measurement temperature: 180° C.

EXAMPLES 2–7 & COMPARATIVE EXAMPLES 5–12

In the same manner as in Example 1, compositions of this invention were separately prepared in accordance with formulations shown below in Table 6. The compositions were separately subjected to extrusion forming, whereby open-cell foams of this invention were obtained. Their characteristics were evaluated in accordance with the same standards as those described above in Table 5-2.

In Examples 5 and 6, the stabilizer was changed from "L-FOS" to tribasic lead sulfate (TS). Results of these examples are not substantially different from those of Example 2. It is hence understood that TS has similar effects to "L-FOS".

In Example 7, neither CPE nor EVA was used as a processing aid. Compared with Examples 1 and 2, the air permeability was found to be slightly lower while the specific gravity and viscosity were found to be higher. Both appearance and cell shape were good. It is hence appreciated that these processing aids are complementary to super high molecular acrylic resin base processing aids. It is therefore understood that no practical problems would arise even if they are not added and an excellent open-cell foam of this invention can still be obtained without them.

Comparative Examples 5–7 are directed to the omission of either one of the anionic surfactant and the wax or low polymerization-degree polyolefin. Foaming itself was found to be excellent but no open-cell foams were formed. It should hence be appreciated from these results that their combined use is a very preferred requirement in the present invention.

Lead stearate, which is a so-called lead soap type stabilizer, was used in lieu of the lead salt type stabilizer in Comparative Examples 8–10. Lead stearate acted in a manner totally different from the lead salt type stabilizer, and characteristics such as appearance, cell shape

TABLE 6

| | Example | | | | | | Comparative Example | | | | | | | |
|---|---|---|---|---|---|---|---|---|---|---|---|---|---|---|
| | 2 | 3 | 4 | 5 | 6 | 7 | 5 | 6 | 7 | 8 | 9 | 10 | 11 | 12 |
| Component | | | | | | | | | | | | | | |
| Resin: Chisso S-450 | 100 | 100 | 100 | 100 | 100 | 100 | 100 | 100 | 100 | 100 | 100 | 100 | 100 | 100 |
| Processing aid: | | | | | | | | | | | | | | |
| ELASLEN 301A | 10 | — | — | 10 | — | — | 10 | 10 | 10 | 10 | 10 | 10 | 10 | 10 |
| SOARBLEN CI$^{(1)}$ | — | 10 | 10 | — | 10 | — | — | — | — | — | — | — | — | — |
| Methablen P-530 | 5 | 5 | 5 | 5 | 5 | 5 | 5 | 5 | 5 | 5 | 5 | 5 | 5 | 5 |
| Surfactant or wax: | | | | | | | | | | | | | | |
| LIPOLAN 1400 | 2 | 2 | 2 | 2 | 2 | 2 | 2 | — | — | 2 | 2 | 2 | 2 | 2 |
| Hoechst Was OP$^{(2)}$ | 1 | — | 1 | 1 | 1 | 1 | — | 1 | — | 1 | — | — | 1 | — |
| FLOTHENE UF-1.5$^{(3)}$ | — | 1 | — | — | — | — | — | — | 1 | — | 1 | — | — | 1 |
| Stabilizer: | | | | | | | | | | | | | | |
| L-FOS | 2 | 2 | 2 | — | — | 2 | 2 | 2 | 2 | — | — | — | 1 | 1 |
| Tribasic lead sulfate | — | — | — | 2 | 2 | — | — | — | — | — | — | — | — | — |
| Lead stearate | — | — | — | — | — | — | — | — | — | 2 | 2 | 2 | 1 | 1 |
| Lubricant: Loxiol G-16 | 2 | 2 | 2 | 2 | 2 | 2 | 2 | 2 | 2 | — | — | — | 2 | 2 |
| Foaming agent: AW-9 | 3 | 3 | 3 | 3 | 3 | 3 | 3 | 3 | 3 | 3 | 3 | 3 | 3 | 3 |
| Filler: NS #100 | 20 | 20 | 20 | 20 | 20 | 20 | 20 | 20 | 20 | 20 | 20 | 20 | 20 | 20 |
| Characteristics | | | | | | | | | | | | | | |
| Appearance | O | O | O | O | O | O | O | O | O | Δ | Δ | Δ | O | O |
| Cell shape | O | O | O | O | O | O | O | O | O | Δ | Δ | Δ | O | O |
| Water permeability | O | O | O | O | O | O | X | X | X | Δ | Δ | Δ | O | O |
| Air Permeability (second) | 2.4 | 3.5 | 3.6 | 2.8 | 3.1 | 4.8 | — | — | — | >100 | >100 | >100 | >100 | >100 |
| Specific gravity | 0.28 | 0.33 | 0.34 | 0.30 | 0.33 | 0.41 | 0.25 | 0.26 | 0.29 | 0.72 | 0.73 | 0.68 | 0.38 | 0.44 |
| Viscosity (× 10$^3$ cps) | 40.2 | 38.1 | 39.8 | 46.5 | 35.2 | 43.3 | 41.3 | 46.6 | 42.9 | 21.4 | 28.8 | 35.7 | 41.7 | 39.3 |

Note:
$^{(1)}$Trade name. EVA base processing aid produced by The Nippon Synthetic Chemical Industry Co., Ltd. (considered to be effective for foamable compositions).
$^{(2)}$Trade name. Ester wax produced by Hoechst Japan Ltd.
$^{(3)}$Trade name. Low polymerization-degree polyethylene produced by Seitetsu Kagaku Co., Ltd.

Referring now to Tables 6, Examples 2 and 4 are different from each other in processing aid, namely, in that CPE was employed in the former example while the EVA-base processing aid was used in the latter example. Use of the EVA-base processing aid resulted in somewhat lower air permeability (greater number in seconds). The other characteristics are substantially comparable. Substantially the same tendency was observed from a comparison between Example 2 and Example 3, although "Hoechst Wax OP" was changed the low polymerization-degree polyethylene.

and air permeability were poor. Lead stearate was hence found to be inappropriate as a stabilizer in the present invention.

Comparative Examples 11 and 12 are directed to the use of the lead salt type stabilizer and lead stearate in combination. Although the foams were good in both appearance and cell shape, their water permeability and air permeability were poor so that they were not usable actually.

This problem was caused due to the excessive lubricity of lead stearate. It is therefore necessary to pay full attention to avoid such a problem when a lead soap type stabilizer is used.

EXAMPLES 8-12

In the same manner as in Example 1, compositions of this invention were separately prepared in accordance with formulations shown below in Table 7-1. The compositions were separately formed into open-cell foams of this invention. They were evaluated in the same manner as in Example 1 to obtain results summarized below in Table 7-2. Their characteristics were evaluated in accordance with the same standards as those described above in Table 5-2.

TABLE 7

| | Example | | | | |
|---|---|---|---|---|---|
| | 8 | 9 | 10 | 11 | 12 |
| Component | | | | | |
| PVC: | | | | | |
| Chisso S-450 | 100 | — | 100 | — | — |
| Chisso SG[(1)] | — | 100 | — | 100 | 100 |
| Processing aid: | | | | | |
| ELASLEN 301A | 10 | 10 | 10 | 10 | 10 |
| Methablen P-530 | 4.0 | 4.0 | 4.0 | 4.0 | 4.0 |
| Stabilizer: Advastab[(1)] BC-1000J | 3.0 | 3.0 | 3.0 | 3.0 | 3.0 |
| Anionic Surfactant: LIPOLAN 1400 | 2.0 | 2.0 | 2.0 | 2.0 | 2.0 |
| Wax: Hoechst Wax OP | 1.0 | 1.0 | 1.0 | 1.0 | 1.0 |
| Lubricant: Loxiol G-16 | 2.0 | 2.0 | 2.0 | 2.0 | 2.0 |
| Foaming agent: AW-9 | 1.5 | 1.5 | 1.5 | 1.5 | 1.5 |
| Foaming accelerator: ZnO | — | — | 0.5 | — | — |
| Internal lubricant: Plasticizer DOP | — | — | — | 2.0 | 2.0 |
| Filler CaCO$_3$ (heavy) | 20 | 20 | 20 | 20 | 20 |
| Temperature conditions (°C.): | | | | | |
| $C_1$ | 100 | 130 | 120 | 130 | 130 |
| $C_2$ | 120 | 140 | 130 | 140 | 140 |
| $C_3$ | 140 | 150 | 140 | 150 | 150 |
| $C_4$ | 160 | 160 | 150 | 160 | 160 |
| $C_5$ | 170 | 170 | 160 | 165 | 170 |
| H | 175 | 175 | 165 | 170 | 175 |
| Revolution number (rpm) | 60 | 60 | 60 | 60 | 60 |
| Characteristics: | | | | | |
| Appearance | O | O | X | O | O |
| Cell shape | O | Δ | Δ | O | Δ |
| Water permeability | Δ | O | O | O | O |
| Air Permeability (seconds) | 1700 | 2.9 | 10.2 | 6.9 | 2.6 |
| Thickness (mm) | 3.0 | 2.2 | 2.6 | 5.0 | 4.9 |

Note:
[(1)]PVC powder produced by Chisso corporation, Average polymerization degree: 600
[(2)]Liquid-type Cd—Ba stabilizer produced by Katsuta Kako K.K.

As envisaged from Tables 7-1 and 7-2, the melting temperature and foaming temperature of PVC were not in conformity in Example 8. Both water peremability and air permeability were poor although the appearance and the state of cells were good. When the average polymerization degree was changed from 450 to 600 (Example 9), the melting temperature and foaming temperature of PVC were brought into conformity, so that the resultant foams had good characteristics except for the cell state. When PVC having the average polymerization degree of 450 and the ZnO kicker were used, the decomposition of the foaming agent took place at a temperature lower than the melting temperature of PVC and the resultant foam had extremely poor appearance (Example 10). When 2.0 phr of DOP was added to the composition of Example 9, a superb open-cell foam was obtained (Example 11) but the increased extrusion temperature resulted in irregular cells (Example 12).

EXAMPLES 13-17

In the same manner as in Example 1, compositions of this invention were separately prepared in accordance with formulations shown below in Table 8-1. The compositions were separately formed into open-cell foams of this invention. They were evaluated in the same manner as in Example 1 to obtain results summarized below in Table 8-2. Their characteristics were evaluated in accordance with the same standards as those described above in Table 5-2.

TABLE 8

| | Example | | | | |
|---|---|---|---|---|---|
| | 13 | 14 | 15 | 16 | 17 |
| Component | | | | | |
| PVC: | | | | | |
| Chisso S-450 | — | 100 | 100 | 100 | 100 |
| Chisso SG | 100 | — | — | — | — |
| Processing aid: | | | | | |
| ELASLEN 301A | 10 | 10 | 10 | 10 | 10 |
| Methablen P-530 | 4.0 | 4.0 | 4.0 | 4.0 | 4.0 |
| Stabilizer: Advastab[(1)] DB-54G | 3.0 | 3.0 | 3.0 | 3.0 | 3.0 |
| Anionic Surfactant: LIPOLAN 1400 | 2.0 | 2.0 | 2.0 | 2.0 | 2.0 |
| Wax: Hoechst Wax OP | 1.0 | 1.0 | 1.0 | 1.0 | 1.0 |
| Lubricant: Loxiol G-16 | 2.0 | 2.0 | 2.0 | 2.0 | 2.0 |
| Foaming agent: AW-9 | 1.5 | 1.5 | 1.5 | 1.5 | 1.5 |
| Foaming inhibitor: Trimellitic anhydride | — | — | 0.5 | 0.3 | 0.3 |
| Internal lubricant: Plasticizer DOP | — | — | — | — | 2.0 |
| Filler CaCO$_3$ (heavy) | 20 | 20 | 20 | 20 | 20 |
| Conditions for extrusion | | | | | |
| Temperature conditions (°C.): | | | | | |
| $C_1$ | 130 | 120 | 120 | 120 | 120 |
| $C_2$ | 140 | 130 | 130 | 130 | 130 |
| $C_3$ | 150 | 140 | 140 | 140 | 140 |
| $C_4$ | 160 | 150 | 150 | 150 | 150 |
| $C_5$ | 165 | 160 | 160 | 160 | 160 |
| H | 170 | 165 | 165 | 165 | 165 |
| Revolution number (rpm) | 60 | 60 | 60 | 60 | 60 |
| Evaluation Characteristics: | | | | | |
| Appearance | X | O | O | O | O |
| Cell shape | X | Δ | O | X | O |
| Water permeability | Δ | Δ | Δ | Δ | Δ |
| Air Permeability (seconds) | — | 2.8 | >1000 | — | 7.8 |
| Thickness (mm) | — | 3.7 | 4.3 | — | 2.0 |

Note:
[(1)]Powdery Cd—Ba stabilizer produced by Katsuta Kako K.K.

Example 13 is directed to a composition making use of PVC having an average polymerization degree of 600. The melting temperature of PVC did not match the decomposition temperature of the foaming agent. When PVC was changed to that having an average polymerization degree of 450 (Example 14), the appearance was improved somewhat but the cell irregularity was considerable and the water permeability was poor. Those problems were caused by the fact that the melting temperature of PVC was higher than the decomposition temperature of the foaming agent. It was hence contemplated that the problems could be improved if the decomposition temperature of the foaming agent would be raised (this requires inhibition of foaming). Accordingly, 0.5 phr of trimellitic acid was added as a foam inhibitor in Example 15. Both appearance and cell state were improved significantly, but the water permeability and air permeability were not satisfactory. Since the above dissatisfaction seemed to be caused by excessive inhibition of foaming, the amount of trimellitic anhydride was reduced to 0.3 phr (Example 16). The appearance was however impaired again. An addition of 2.0 phr of DOP to the composition of Example 16 resulted in the formation of an article, which was excellent in air permeability, appearance and cell state although the water permeability was somewhat inferior (Example 17).

EXAMPLES 18–22

In the same manner as in Example 1, compositions of this invention were separately prepared in accordance with formulations shown below in Table 9-1. The compositions were separately formed into open-cell foams of this invention. They were evaluated in the same manner as in Example 1 to obtain results summarized below in Table 9-2. Their characteristics were evaluated in accordance with the same standards as those described above in Table 5-2.

TABLE 9

|  | Example | | | | |
| --- | --- | --- | --- | --- | --- |
|  | 18 | 19 | 20 | 21 | 22 |
| Component | | | | | |
| PVC: | | | | | |
| Chisso SG | — | — | 100 | — | — |
| Kureha S-9007[1] | 100 | 100 | — | 100 | 100 |
| Processing aid: | | | | | |
| ELASLEN 301A | 10 | 10 | 10 | 10 | 10 |
| Methablen P-530 | 4.0 | 4.0 | 4.0 | 4.0 | 4.0 |
| Stabilizer: | | | | | |
| Mark SP-55[2] | — | 3.0 | 3.0 | 3.0 | 3.0 |
| Advastab[3] TM181FSJ | 2.0 | — | — | — | — |
| Anionic Surfactant: LIPOLAN 1400 | 2.0 | 2.0 | 2.0 | 2.0 | 2.0 |
| Wax: Hoechst Wax OP | 1.0 | 1.0 | 1.0 | 1.0 | 1.0 |
| Lubricant: Loxiol G-16 | 2.0 | 2.0 | 2.0 | 2.0 | 2.0 |
| Foaming agent: AW-9 | 1.5 | 1.5 | 1.5 | 1.0 | 1.0 |
| Internal lubricant: Plasticizer DOP | — | — | — | 2.0 | — |
| Filler: $CaCO_3$ (heavy) | 20 | 20 | 20 | 20 | 20 |
| Conditions for extrusion | | | | | |
| Temperature conditions (°C.): | | | | | |
| $C_1$ | 120 | 120 | 130 | 120 | 120 |
| $C_2$ | 140 | 140 | 140 | 140 | 140 |
| $C_3$ | 160 | 160 | 150 | 160 | 160 |
| $C_4$ | 170 | 170 | 160 | 170 | 170 |
| $C_5$ | 180 | 180 | 165 | 175 | 175 |
| H | 185 | 185 | 170 | 180 | 180 |
| Revolution number (rpm) | 60 | 60 | 60 | 60 | 60 |
| Evaluation Characteristics: | | | | | |
| Appearance | Δ | Δ | O | O | O |
| Cell shape | X | X | Δ | O | Δ |
| Water permeability | Δ | Δ | Δ | Δ | Δ |
| Air Permeability (seconds) | 0.7 | — | 1.1 | 8.6 | 6.1 |

TABLE 9-continued

|  | Example | | | | |
| --- | --- | --- | --- | --- | --- |
|  | 18 | 19 | 20 | 21 | 22 |
| Thickness (mm) | 1.0 | — | 2.4 | 3.5 | 2.6 |

Note:
[1]Product of Kureha Chemical Industry Co., Ltd., average polymerization degree: 700.
[2]Powdery Ca—Zn stabilizer produced by Adeka Argus Chemical Co., Ltd.
[3]Liquid-type tin mercaptide stabilizer produced by Katsuta Kako K.K.

A PVC resin the polymerization degree of which was 700 was used in Examples 18, 20, 21 and 22. The processing temperature and the deformation temperature of the foaming agent seemed to be consistent in timing in Example 19, but hollow cavities were formed and the cell state was irregular. The stabilizer was therefore changed to the tin mercaptide type stabilizer which is effective in raising the decomposition temperature of the foaming agent (Example 18). The cell irregularity was improved somewhat but the resultant foam was not still considered to be good in overall characteristics. When PVC was changed to "Chisso SG" (average polymerization degree: 600) (Example 20), the cell irregularity was reduced but the resultant foam was not still considered to be good. Thus, DOP was added to increase the cell strength and the amount of the foaming agent was reduced to 1.0 phr with a view toward reducing the cell irregularity (Example 21). It was possible to obtain a foam which was good in overall characteristics, although its water permeability was a little bit poor. Omission of the plasticizer DOP again caused cell irregularity (Example 22). Effects of DOP as an internal lubricant were remarkable.

EXAMPLES 23 and 24

In the same manner as in Example 1, compositions of this invention were separately prepared in accordance with formulations shown below in Table 10-1. The compositions were separately formed into open-cell foams of this invention. They were evaluated in the same manner as in Example 1 to obtain results summarized below in Table 10-2. Their characteristics were evaluated in accordance with the same standards as those described above in Table 5-2.

TABLE 10

|  | Example | |
| --- | --- | --- |
|  | 23 | 24 |
| Component | | |
| PVC: | | |
| Chisso SG | — | 100 |
| Kureha S-9007[1] | 100 | — |
| Processing aid: | | |
| ELASLEN 301A | 10 | 10 |
| Methablen P-530 | 4.0 | 4.0 |
| Stabilizer: | 3.0 | 3.0 |
| Mark AC-116[1] | | |
| Anionic Surfactant: LIPOLAN 1400 | 2.0 | 2.0 |
| Wax: Hoechst Wax OP | 1.0 | 1.0 |
| Lubricant: Loxiol G-16 | 2.0 | 2.0 |
| Foaming agent: AW-9 | 1.5 | 1.5 |
| Filler: $CaCO_3$ (heavy) | 20 | 20 |
| Conditions for extrusion | | |
| Temperature conditions (°C.): | | |
| $C_1$ | 130 | 120 |
| $C_2$ | 140 | 130 |
| $C_3$ | 150 | 140 |

TABLE 10-continued

| | Example | |
|---|---|---|
| | 23 | 24 |
| C$_4$ | 160 | 150 |
| C$_5$ | 170 | 160 |
| H | 175 | 165 |
| Revolution number (rpm) | 60 | 60 |
| Evaluation Characteristics: | | |
| Appearance | X | O |
| Cell shape | X | O |
| Water permeability | Δ | O |
| Air Permeability (seconds) | — | 1.8 |
| Thickness (mm) | — | 2.7 |

Note:
[1]Liquid-type Ca-Zn stabilizer produced by Adeka Argus Chemical Co., Ltd.

Since the above stabilizer reduced the decomposition temperature of the foaming agent to a considerable extent, the decomposition temperature of the foaming agent did not conform with the processing temperature of the composition containing the PVC-base resin having the polymerization degree of 700 (Example 23). Good foams were not obtained accordingly. In contrast, the use of PVC, the polymerization degree of which was 450, and the lower processing temperature provided very good foams (Example 24).

EXAMPLES 25-29

In the same manner as in Example 1, compositions of this invention were separately prepared in accordance with formulations shown below in Table 11-1. The compositions were separately formed into open-cell foams of this invention. They were evaluated in the same manner as in Example 1 to obtain results summarized below in Table 11-2. Their characteristics were evaluated in accordance with the same standards as those described above in Table 5-2.

TABLE 11

| | Example | | | | |
|---|---|---|---|---|---|
| | 25 | 26 | 27 | 28 | 29 |
| Component | | | | | |
| PVC: | | | | | |
| Chisso S-450 | 100 | — | 100 | — | 100 |
| Chisso SG | — | 100 | — | 100 | — |
| Processing aid: | | | | | |
| ELASLEN 301A | 10 | 10 | 10 | 10 | 10 |
| Methablen P-530 | 4.0 | 4.0 | 4.0 | 4.0 | 4.0 |
| Stabilizer: | | | | | |
| Mark OF-19[1] | 3.0 | 3.0 | 3.0 | 3.0 | 3.0 |
| Anionic Surfactant: | | | | | |
| LIPOLAN 1400 | 2.0 | 2.0 | 2.0 | 2.0 | 2.0 |
| Wax: | | | | | |
| Hoechst Wax OP | 1.0 | 1.0 | 1.0 | 1.0 | 1.0 |
| Lubricant: | | | | | |
| Loxiol G-16 | 2.0 | 2.0 | 2.0 | 2.0 | 2.0 |
| Foaming agent: AW-9 | 1.5 | 1.5 | 1.5 | 1.5 | 1.5 |
| Internal lubricant: | | | | | |
| Plasticizer DOP | — | — | 2.0 | 2.0 | 5.0 |
| Filler: | | | | | |
| CaCO$_3$ (heavy) | 20 | 20 | 20 | 20 | 20 |
| Conditions for extrusion | | | | | |
| Temperature conditions (°C.): | | | | | |
| C$_1$ | 120 | 130 | 120 | 130 | 115 |
| C$_2$ | 130 | 140 | 130 | 140 | 125 |
| C$_3$ | 140 | 150 | 140 | 150 | 135 |
| C$_4$ | 150 | 160 | 150 | 160 | 145 |
| C$_5$ | 160 | 165 | 160 | 165 | 155 |

TABLE 11-continued

| | Example | | | | |
|---|---|---|---|---|---|
| | 25 | 26 | 27 | 28 | 29 |
| H | 165 | 170 | 165 | 170 | 160 |
| Revolution number (rpm) | 60 | 60 | 60 | 60 | 60 |
| Evaluation Characteristics: | | | | | |
| Appearance | O | Δ | O | Δ | O |
| Cell shape | X | X | O | X | O |
| Water permeability | X | X | Δ | X | X |
| Air Permeability (seconds) | — | — | 1.9 | — | 27.1 |
| Thickness (mm) | — | — | 2.4 | — | 3.00 |

Note:
[1]Powdery Ba-Zn stabilizer produced by Adeka Argus Chemical Co., Ltd.

In both Example 25 (polymerization degree of PVC: 450) and Example 26 (polymerization degree of PVC: 600), hollow cavities were formed so that good foams were not obtained. When PVC having the polymerization degree of 450 was employed and 2.0 phr of DOP was added to increase the cell strength, the cell state was improved very well (Example 27). However, the cell state was not improved in the case of the composition containing "Chisso SG" (polymerization degree: 600) (Example 28). When the amount of DOP was increased to 5.0 phr, the water permeability was impaired significantly (Example 29). The upper limit of DOP thus appears to be 5.0 phr.

EXAMPLES 30-32

In the same manner as in Example 1, compositions of this invention were separately prepared in accordance with formulations shown below in Table 12-1. The compositions were separately formed into open-cell foams of this invention. They were evaluated in the same manner as in Example 1 to obtain results summarized below in Table 12-2. Their characteristics were evaluated in accordance with the same standards as those described above in Table 5-2.

TABLE 12

| | Example | | |
|---|---|---|---|
| | 30 | 31 | 32 |
| Component | | | |
| PVC: | | | |
| Chisso SG | 100 | — | — |
| Chisso SG | — | 100 | 100 |
| Processing aid: | | | |
| ELASLEN 301A | 10 | 10 | 10 |
| Methablen P-530 | 4.0 | 4.0 | 4.0 |
| Stabilizer: | | | |
| Mark AC-186[1] | 3.0 | 3.0 | 3.0 |
| Anionic Surfactant: | | | |
| LIPOLAN 1400 | 2.0 | 2.0 | 2.0 |
| Wax: | | | |
| Hoechst Wax OP | 1.0 | 1.0 | 1.0 |
| Lubricant: | | | |
| Loxiol G-16 | 2.0 | 2.0 | 2.0 |
| Foaming agent: AW-9 | 1.5 | 1.5 | 1.5 |
| Filler | | | |
| CaCO$_3$ (heavy) | 20 | 20 | 20 |
| Conditions for extrusion | | | |
| Temperature conditions (°C.): | | | |
| C$_1$ | 130 | 120 | 130 |
| C$_2$ | 140 | 130 | 140 |
| C$_3$ | 150 | 140 | 150 |
| C$_4$ | 160 | 150 | 160 |
| C$_5$ | 165 | 160 | 165 |
| H | 170 | 165 | 170 |
| Revolution number | 60 | 60 | 60 |

EXAMPLES 33-39

In the same manner as in Example 1, compositions of this invention were separately prepared in accordance with formulations shown below in Table 13-1. The compositions were separately formed into open-cell foams of this invention. They were evaluated in the same manner as in Example 1 to obtain results summarized below in Table 13-2. Their characteristics were evaluated in accordance with the same standards as those described above in Table 5-2.

TABLE 12-continued

|  | Example 30 | Example 31 | Example 32 |
|---|---|---|---|
| (rpm) |  |  |  |
| Evaluation Characteristics: |  |  |  |
| Appearance | O | O | O |
| Cell shape | X | O | O |
| Water permeability | Δ | Δ | O |
| Air Permeability (seconds) | — | 380 | 21.5 |
| Thickness (mm) | — | 2.6 | 2.4 |

Note:
(1)Liquid-type Ba-Zn stabilizer produced by Adeka Argus Chemical Co., Ltd.

Regarding the polymerization degree of PVC, the polymerization degree of 450 is apparently superior. The pocessing temperature is somewhat higher in Example 32 than in Example 31 (the temperature was set at 170° C. in the head portion in the former example), excellent temperature balance and timing were exhibited.

TABLE 13

|  | 33 | 34 | 35 | 36 | 37 | 38 | 39 |
|---|---|---|---|---|---|---|---|
| Component |  |  |  |  |  |  |  |
| PVC: |  |  |  |  |  |  |  |
| Chisso SG | 100 | 100 | — | — | — | — | — |
| Chisso S-450 | — | — | 100 | 100 | 100 | 100 | 100 |
| Processing aid: |  |  |  |  |  |  |  |
| ELASLEN 301A | 10 | 10 | 10 | 10 | 10 | 10 | 10 |
| Methablen P-530 | 4.0 | 4.0 | 4.0 | 4.0 | 4.0 | 4.0 | 4.0 |
| NBR | — | — | — | — | — | 5.0 | — |
| Stabilizer: |  |  |  |  |  |  |  |
| Mark OF-30[1] | 3.0 | 3.0 | 3.0 | 3.0 | 3.0 | 3.0 | 3.0 |
| Advastab TM181FSJ | — | 1.0 | — | — | 1.0 | — | — |
| Anionic Surfactant: |  |  |  |  |  |  |  |
| LIPOLAN 1400 | 2.0 | 2.0 | 2.0 | 2.0 | 2.0 | 2.0 | 2.0 |
| Wax: |  |  |  |  |  |  |  |
| Hoechst Wax OP | 1.0 | 1.0 | 1.0 | 1.0 | 1.0 | 1.0 | 1.0 |
| Lubricant: |  |  |  |  |  |  |  |
| Loxiol G-16 | 2.0 | 2.0 | 2.0 | 2.0 | 2.0 | 2.0 | 2.0 |
| Foaming agent: AW-9 | 1.5 | 1.5 | 1.5 | 1.0 | 1.0 | 1.0 | 1.0 |
| Foaming inhibitor: |  |  |  |  |  |  |  |
| $SnO_2$ | — | — | 3.0 | — | — | — | — |
| Trimellitic anhydride | — | — | — | — | — | — | 0.5 |
| Internal lubricant: | — | — | — | 2.0 | — | — | — |
| Plasticizer DOP |  |  |  |  |  |  |  |
| Filler: |  |  |  |  |  |  |  |
| $CaCO_3$ (heavy) | 20 | 20 | 20 | 20 | 20 | 20 | 20 |
| Conditions for extrusion |  |  |  |  |  |  |  |
| Temperature conditions (°C.): |  |  |  |  |  |  |  |
| $C_1$ | 130 | 120 | 120 | 120 | 120 | 120 | 120 |
| $C_2$ | 140 | 130 | 130 | 130 | 130 | 130 | 130 |
| $C_3$ | 150 | 140 | 140 | 140 | 140 | 140 | 140 |
| $C_4$ | 160 | 150 | 150 | 150 | 150 | 150 | 150 |
| $C_5$ | 170 | 160 | 160 | 160 | 160 | 160 | 160 |
| H | 175 | 165 | 165 | 165 | 165 | 165 | 165 |
| Revolution number (rPm) |  | 60 | 60 | 60 | 60 | 60 | 60 |
| Evaluation Characteristics: |  |  |  |  |  |  |  |
| Appearance | X | X | X | O | O | O | O |
| Cell shape | O | X | X | Δ | O | X | O |
| Water permeability | Δ | Δ | O | O | Δ | Δ | O |
| Air Permeability (second) | — | — | — | 6.4 | 2.8 | — | 8.4 |
| Thickness (mm) | — | — | — | 2.6 | 3.3 | — | 2.5 |

Note:
[1]Powdery Mg-Zn stabilizer produced by Adeka Argus Chemical Co., Ltd.

The Mg-Zn type stabilizer has strong effects in promoting the decomposition of the foaming agent. Its use was hence unsuitable in the usual composition (Example 33). This problem was not improved even when the Sn-type stabilizer having foaming inhibitory effects was added in combination (Example 34). It was still dissatisfactory even with the composition in which the polymerization degree was low and foaming inhibitory effects were imparted (Example 35). Good results were obtained for the first time upon addition of DOP (Example 36). Excellent results were obtained in Example 37 in which the amount of the foaming agent was reduced from 1.5 phr to 1.0 phr and the tin mercaptide type stabilizer, "TM181FSJ", was added instead of $SnO_2$ of Example 35. Results similar to those of Example 37 were also obtained when trimellitic acid was added as a foam inhibitor (Example 39). The effectiveness of the plasticizer (DOP) as an internal lubricant was proven, for example, in Examples 11, 12, 17, 21 and 27, but the cell irregularity was not improved even when DOP was replaced by a rubbery substance such as NBR (Example 38) or the amount of "Methablen P-530" was increased from 4.0 phr to 6.0 phr. This indicates the very high effectiveness of a liquid plasticizer.

EXAMPLES 40–42

In the same manner as in Example 1, compositions of this invention were separately prepared in accordance with formulations shown below in Table 14-1. The compositions were separately formed into open-cell forms of this invention. They were evaluated in the same manner as in Example 1 to obtain results summarized below in Table 14-2. Their characteristics were evaluated in accordance with the same standards as those described above in Table 5-2.

TABLE 14

|  | Example | | |
|---|---|---|---|
|  | 40 | 41 | 42 |
| Component |  |  |  |
| PVC: |  |  |  |
| Chisso SG | 100 | 100 | 100 |
| Processing aid: |  |  |  |
| ELASLEN 301A | 10 | 10 | 10 |
| Methablen P-530 | 4.0 | 4.0 | 4.0 |
| Stabilizer: |  |  |  |
| Mark AC-113[1] | 3.0 | 3.0 | 3.0 |
|  | 3.0 | 3.0 | 3.0 |
| Anionic Surfactant: |  |  |  |
| LIPOLAN 1400 | 2.0 | 2.0 | 2.0 |
| Wax: |  |  |  |
| Hoechst Wax OP | 1.0 | 1.0 | 1.0 |
| Lubricant: |  |  |  |
| Loxiol G-16 | 2.0 | 2.0 | 2.0 |
| Foaming agent: AW-9 | 1.5 | 1.5 | 1.5 |
| Filler: |  |  |  |
| $CaCO_3$ (heavy) | 20 | 20 | 20 |
| Conditions for extrusion |  |  |  |
| Temperature conditions (°C.): |  |  |  |
| $C_1$ | 125 | 130 | 110 |
| $C_2$ | 135 | 140 | 130 |
| $C_3$ | 145 | 150 | 150 |
| $C_4$ | 155 | 160 | 170 |
| $C_5$ | 165 | 170 | 175 |
| H | 170 | 175 | 180 |
| Revolution number (rpm) | 60 | 60 | 60 |
| Evaluation |  |  |  |
| Characteristics: |  |  |  |
| Appearance | O | O | O |
| Cell shape | O | O | O |
| Water permeability | Δ | O | O |
| Air Permeability (seconds) | 11.4 | 3.1 | 2.5 |
| Thickness (mm) | 3.2 | 3.1 | 3.7 |

Note:
[1]Liquid-type Mg-Zn stabilizer produced by Adeka Argus Chemical Co., Ltd.

The liquid Mg-Zn type stabilizer had very good applicability for compositions of PVC having the polymerization degree of 600. Over a wide range of temperatures, were obtained foams having an excellent cell structure and superb water permeability and air permeability.

EXAMPLES 43–47

In the same manner as in Example 1, compositions of this invention were separately prepared in accordance with formulations shown below in Table 15-1. The compositions were separately formed into open-cell foams of this invention. They were evaluated in the same manner as in Example 1 to obtain results summarized below in Table 15-2. Their characteristics were evaluated in accordance with the same standards as those described above in Table 5-2.

TABLE 15

|  | Example | | | | |
|---|---|---|---|---|---|
|  | 43 | 44 | 45 | 46 | 47 |
| Component |  |  |  |  |  |
| PVC: |  |  |  |  |  |
| Chisso SR[1] | 100 | — | — | 100 | — |
| Chisso SG | — | — | — | — | 100 |
| Kureha S-9007 | — | 100 | 100 | — | — |
| Processing aid: |  |  |  |  |  |
| ELASLEN 301A | 10 | 10 | 10 | 10 | 10 |
| Methablen P-530 | 4.0 | 4.0 | 4.0 | 4.0 | 4.0 |
| Stabilizer: | 2.0 | 2.0 | 2.0 | 2.0 | 2.0 |
| Advastab TM181FSJ |  |  |  |  |  |
| Anionic Surfactant: | 2.0 | 2.0 | 2.0 | 2.0 | 2.0 |
| LIPOLAN 1400 |  |  |  |  |  |
| Wax | 1.0 | 1.0 | 1.0 | 1.0 | 1.0 |
| Hoechst Wax OP |  |  |  |  |  |
| Lubricant: | 2.0 | 2.0 | 2.0 | 2.0 | 2.0 |
| Loxiol G-16 |  |  |  |  |  |
| Foaming agent: AW-9 | 1.5 | 1.5 | 1.5 | 1.5 | 1.5 |
| Foaming accelerator: |  |  |  |  |  |
| ZnO | — | — | 3.0 | — | — |
| Zn-type kicker[2] | — | — | — | 2.0 | 2.0 |
| Filler: | 20 | 20 | 20 | 20 | 20 |
| $CaCO_3$ (heavy) |  |  |  |  |  |
| Conditions for extrusion |  |  |  |  |  |
| Temperature conditions (°C.): |  |  |  |  |  |
| $C_1$ | 120 | 120 | 120 | 130 | 130 |
| $C_2$ | 140 | 140 | 140 | 140 | 140 |
| $C_3$ | 160 | 150 | 160 | 160 | 150 |
| $C_4$ | 180 | 160 | 170 | 180 | 160 |
| $C_5$ | 190 | 170 | 175 | 190 | 170 |
| H | 200 | 180 | 180 | 200 | 175 |
| Revolution number (rpm) | 60 | 60 | 60 | 60 | 60 |
| Evaluation |  |  |  |  |  |
| Characteristics: |  |  |  |  |  |
| Appearance | O | O | O | Δ | O |
| Cell shape | O | O | O | O | O |
| Water permeability | X | X | X | O | Δ |
| Air Permeability (seconds) | 1000< | 1000< | 1000< | 6.4 | 2.9 |
| Thickness (mm) | 2.5 | 3.2 | 2.7 | 3.4 | 2.8 |

Note:
[1]Polymerization degree: 800.
[2]Zinc soap type stabilizer.

Since the tin mercaptide type stabilizer has effects to retard or inhibit the decomposition of the foaming agent, PVC having the polymerization degree of 800 was used (Example 43). The resultant foam was very good in both appearance and cell structure, but its water permeability and air permeability were both poor. The same tendency was also observed when the polymerization degree was 700 (Example 44). This tendency was not improved even when zinc oxide, which promotes the decomposition of the foaming agent, was added (Example 45). This seems to be attributable to insufficient decomposition of the foaming agent. It is a very effective measure to add a liquid kicker of the Zn soap type. In the case of the composition of PVC having the polymerization degree of 800 (Example 46), an excellent open-cell foam was obtained. In the case of the composition of PVC having the polymerization degree of 600, it is a little too much to add the kicker in an amount of 2.0 phr. It is suitable to add it in an amount of 1.0 phr. Results of these experiments have indicated that even when PVC having the polymerization degree of 800, rather high as the polymerization degree of PVC for a composition for open-cell foams, is used, excellent open-cell foams can still be obtained by adjusting the decomposition temperature of a foaming agent toward the side of higher temperatures.

EXAMPLES 48 and 49

In the same manner as in Example 1, compositions of this invention were separately prepared in accordance with formulations shown below in Table 16-1. The compositions were separately formed into open-cell foams of this invention, They were evaluated in the same manner as in Example 1 to obtain results summarized below in Table 16-2. Their characteristics were evaluated in accordance with the same standards as those described above in Table 5-2.

TABLE 16

| | Example | |
|---|---|---|
| | 48 | 49 |
| Component | | |
| PVC: | | |
| Chisso SR | 100 | 100 |
| Processing aid: | | |
| ELASLEN 301A | 10 | 10 |
| Methablen P-530 | 4.0 | 4.0 |
| Stabilizer: | | |
| Advastab[1] T-12PJ | 1.0 | 1.0 |
| Advastab T-18J[2] | 1.0 | 1.0 |
| Anionic Surfactant: | 2.0 | 2.0 |
| LIPOLAN 1400 | | |
| Wax: | 1.0 | 1.0 |
| Hoechst Wax OP | | |
| Lubricant: | 2.0 | 2.0 |
| Loxiol G-16 | | |
| Foaming agent: AW-9 | 1.5 | 1.5 |
| Internal lubricant: | — | 2.0 |
| Plasticizer DOP | | |
| Filler: | 20 | 20 |
| CaCO$_3$ (heavy) | | |
| Conditions for extrusion | | |
| Temperature conditions (°C.): | | |
| C$_1$ | 120 | 140 |
| C$_2$ | 140 | 150 |
| C$_3$ | 160 | 160 |
| C$_4$ | 170 | 170 |
| C$_5$ | 180 | 180 |
| H | 185 | 185 |
| Revolution number (rpm) | 60 | 60 |
| Evaluation | | |
| Characteristics: | | |
| Appearance | Δ | O |
| Cell shape | X | O |
| Water permeability | O | O |
| Air Permeability (seconds) | — | 1.9 |
| Thickness (mm) | — | 2.9 |

Note:
[1]Dibutyltin dilaurate produced by Katsuta Kako K.K.
[2]Dibutyltin maleate produced by Katsuta Kako K.K.

In the case of the dibutyltin-type liquid stabilizers as tin type stabilizers, hollow foams were obtained (Example 48). However, the addition of DOP in the amount of 2.0 phr gave superb results. 185° C. was suitable as the head temperature. Below this temperature, the air permeability was reduced (from 1.9 seconds to 158 seconds). On the other hand, cells became irregular at temperatures higher than the above-mentioned level.

EXAMPLES 50 and 51

In the same manner as in Example 1, compositions of this invention were separately prepared in accordance with formulations shown below in Table 17-1. The compositions were separately formed into open-cell foams of this invention. They were evaluated in the same manner as in Example 1 to obtain results summarized below in Table 17-2. Their characteristics were evaluated in accordance with the same standards as those described above in Table 5-2.

TABLE 17

| | Example | |
|---|---|---|
| | 50 | 51 |
| Component | | |
| PVC: | | |
| Chisso S-450 | 100 | 100 |
| Processing aid: | | |
| ELASLEN 301A | 10 | 10 |
| Methablen P-530 | 4.0 | 4.0 |
| Stabilizer: | | |
| Lead stearate | 2.0 | — |
| DBL | — | 2.0 |
| Anionic Surfactant: | 2.0 | 2.0 |
| LIPOLAN 1400 | | |
| Wax: | 2.0 | 2.0 |
| Polyethylene glycol 4000 | | |
| Lubricant: | 2.0 | 2.0 |
| Loxiol G-16 | | |
| Foaming agent: AW-9 | 1.5 | 1.5 |
| Filler: | 20 | 20 |
| CaCO$_3$ (heavy) | | |
| Conditions for extrusion | | |
| Temperature conditions (°C.): | | |
| C$_1$ | 130 | 120 |
| C$_2$ | 140 | 130 |
| C$_3$ | 150 | 140 |
| C$_4$ | 160 | 150 |
| C$_5$ | 170 | 160 |
| H | 175 | 165 |
| Revolution number (rpm) | 60 | 60 |
| Evaluation | | |
| Characteristics: | | |
| Appearance | O | O |
| Cell shape | O | O |
| Water permeability | Δ | Δ |
| Air Permeability (seconds) | 0.7 | 2.3 |
| Thickness (mm) | 1.8 | 2.9 |

Both lead stearate and dibasic lead stearate have strong lubricity. In the case of a usual composition, they cannot be fully kneaded in an extruder so that the composition cannot be extruded. Polyethylene glycol 4000 was hence emplyed in place of "Hoechast Wax OP". According, both stabilizers gave excellent results.

Having now fully described the invention, it will be apparent to one of ordinary skill in the art that many changes and modifications can be made thereto without departing from the spirit or scope of the invention as set forth herein.

We claim:

1. A hard polyvinyl chloride resin composition comprising, an essential components thereof, the following components (a)–(e):

(a) a polyvinyl chloride base resin produced by suspension polymerization and/or bulk polymerization;

(b) a super high molcular acrylic resin base processing aid of molecualr weight of at least 1,000,000;

(c) a stabilizer containing one or more Group-II and/or Group-IV metals, said stabilizer being free of any Group-I metal;

(d) a surfactant which is a combination of an anionic surfactant and a non-ionic surfactant or a combination of an anionic surfactant and a low polymerization-degree polyolefin or wax; and (e) a heat-decomposable organic foaming agent.

2. The composition as claimed in claim 1, wherein the average molecular weight of the polyvinyl chloride base resin is in a range of 300–800.

3. The composition as claimed in claim 1, wherein the stabilizer is a lead salt type stabilizer.

4. The composition as claimed in claim 3, wherein the lead salt type stabilizer is composed of one or more compounds selected from the group consisting of dibasic lead sulfite, tribasic lead sulfate, white lead, coprecipitated lead silicate and silica gel and dibasic lead phthalate.

5. The composition as claimed in claim 1, wherein the stabilizer is a lead soap type stabilizer.

6. The composition as claimed in claim 5, wherein the lead soap type stabilizer is composed of lead stearate and/or dibasic lead stearate.

7. The composition as claimed in claim 1, wherein the stabilizer is a composite Cd-Ba type stabilizer.

8. The composition as claimed in claim 1, wherein the stabilizer is a composite Ca-Zn type stabilizer.

9. The composition as claimed in claim 1, wherein the stabilizer is a composite Ba-Zn type stabilizer.

10. The composition as claimed in claim 1, wherein the stabilizer is a composite Mg-Zn type stabilizer.

11. The composition as claimed in claim 1, wherein the stabilizer is an Sn type stabilizer.

12. The composition as claimed in claim 1, wherein the foaming agent is azodicarbonamide.

13. The composition as claimed in claim 1, further comprising a chlorinated polyethylene base processing aid.

14. The composition as claimed in claim 1, further comprising a liquid plasticizer in an amount not greater than 5 phr.

15. The composition as claimed in claim 1, further comprising a powdery filler.

16. The composition as claimed in claim 1, further comprising a pigment and/or lubricant.

17. The composition as claimed in claim 1, wherein the stabilizer is a lead soap type stabilizer and the composition further comprises polyethylene glycol.

18. A hard polyvinyl chloride resin oepn-cell foam formed, by extrusion, from a composition which comprises as essential components thereof the following components (a)–(e):

(a) a polyvinyl chloride base resin produced by suspension polymerization and/or bulk polymerization;

(b) a super high molecular acrylic resin base processing said of molecular weight of at least 1,000,000;

(c) a stabilizer containing one or more Group-II and/or Group-IV metals, said stabilizer being free of any Group-I metal;

(d) a surfactant which is a combination of an anionic surfactant and a non-ionic surfanctant or a combination of an anionic surfactant and a low polymerization-degree polyolefin or wax; and (e) a heat-decomposable organic foaming agent.

19. The foam as claimed in claim 18, wherein the average molecular weight of the polyvinyl chloride base resin is in a range of 300–800.

20. The foam as claimed in claim 18, wherein the stabilizer is a lead salt type stabilizer.

21. The foam as claimed in claim 20, wherein the lead salt type stabilizer is composed of one or more compounds selected from the group consisting of dibasic lead sulfite, tribasic lead sulfate, white lead, coprecipitated lead silicate and silica gel and dibasic lead phthalate.

22. The foam as claimed in claim 18, wherein the stabilizer is a lead soap type stabilizer.

23. The foam as claimed in claim 22, wherein the lead soap type stabilizer is composed of lead stearate and/or dibasic lead stearate.

24. The foam as claimed in claim 18, wherein the stabilizer is a composite Cd-Ba type stabilizer.

25. The foam as claimed in claim 18, wherein the stabilizer is a composite Ca-Zn type stabilizer.

26. The foam as claimed in claim 18, wherein the stabilizer is a composite Ba-Zn type stabilizer.

27. The foam as claimed in claim 18, wherein the stabilizer is a composite Mg-Zn type stabilizer.

28. The foam as claimed in claim 18, wherein the stabilizer is an Sn type stabilizer.

29. The foam as claimed in claim 18, wherein the foaming agent is azodicarbonamide.

30. The foam as claimed in claim 18, further comprising a chlorinated polyethylene base processing aid.

31. The foam as claimed in claim 18, further comprising a liquid plasticizer in an amount not greater than 5 phr.

32. The foam as claimed in claim 18, further comprising a powdery filler.

33. The foam as claimed in claim 18, further comprising a pigment and/or lubricant.

34. The foam as claimed in claim 18, wherein the stabilizer is a lead soap type stabilizer and the foam further comprises polyethylene glycol.

35. The composition as claimed in claim 1, wherein the acrylic resin base is an acyrlic ester resin or methacrylic ester resin.

36. The foam as claimed in claim 18, wherein the acrylic resin base is an acrylic ester resin or methacrylic ester resin.

* * * * *